(12) United States Patent
Edge

(10) Patent No.: US 10,375,669 B2
(45) Date of Patent: Aug. 6, 2019

(54) METHODS AND SYSTEMS FOR LOCATING A MOBILE DEVICE USING AN ASYNCHRONOUS WIRELESS NETWORK

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/967,167

(22) Filed: Apr. 30, 2018

(65) Prior Publication Data

US 2019/0045477 A1   Feb. 7, 2019

Related U.S. Application Data

(60) Provisional application No. 62/541,250, filed on Aug. 4, 2017.

(51) Int. Cl.
| | |
|---|---|
| *H04W 64/00* | (2009.01) |
| *H04W 24/08* | (2009.01) |
| *G01S 5/06* | (2006.01) |
| *H04W 84/04* | (2009.01) |

(52) U.S. Cl.
CPC .............. *H04W 64/00* (2013.01); *G01S 5/06* (2013.01); *H04W 24/08* (2013.01); *H04W 64/003* (2013.01); *H04W 84/042* (2013.01)

(58) Field of Classification Search
CPC combination set(s) only.
See application file for complete search history.

(56) References Cited

U.S. PATENT DOCUMENTS

| 6,681,099 B1* | 1/2004 | Keranen | H04W 64/00 342/357.25 |
|---|---|---|---|
| 2002/0094820 A1* | 7/2002 | Keranen | G01S 5/14 455/456.5 |
| 2003/0148774 A1* | 8/2003 | Naghian | H04W 64/00 455/456.1 |

(Continued)

FOREIGN PATENT DOCUMENTS

| WO | 2012129730 A1 | 10/2012 |
|---|---|---|
| WO | 2016176845 A1 | 11/2016 |

OTHER PUBLICATIONS

International Search Report and Written Opinion—PCT/US2018/033913—ISA/EPO—Aug. 17, 2018.

*Primary Examiner* — Mazda Sabouri
(74) *Attorney, Agent, or Firm* — Kilpatrick Townsend & Stockton, LLP

(57) ABSTRACT

Techniques described herein are directed to position determination of a user equipment (UE) in an asynchronous wireless network, such as a 4G or 5G network. In one embodiment, a base station measures real time differences (RTDs) to neighboring base stations and a Round Trip signal propagation Time (RTT) to the UE and receives Reference Signal Time Difference (RSTD) measurements from the UE, whereby a location of the UE is determined using the RTD measurements, RTT measurement and RSTD measurements. In other embodiments, the UE may obtain the RTT and RSTD measurements and may receive RTD measurements from a base station, whereby a location of the UE is determined by the UE or by a location server.

29 Claims, 11 Drawing Sheets

(56) References Cited

U.S. PATENT DOCUMENTS

| | | | | |
|---|---|---|---|---|
| 2004/0264407 | A1* | 12/2004 | Tang | G01S 5/02 |
| | | | | 370/328 |
| 2007/0121560 | A1* | 5/2007 | Edge | H04W 64/00 |
| | | | | 370/338 |
| 2008/0032706 | A1* | 2/2008 | Sheynblat | G01S 5/0036 |
| | | | | 455/456.1 |
| 2011/0077030 | A1* | 3/2011 | Wigren | G01S 5/0252 |
| | | | | 455/456.5 |
| 2012/0165012 | A1 | 6/2012 | Fischer et al. | |
| 2013/0109405 | A1* | 5/2013 | Siomina | G01S 5/0252 |
| | | | | 455/456.1 |
| 2013/0316727 | A1* | 11/2013 | Edge | H04W 4/02 |
| | | | | 455/456.1 |
| 2015/0094089 | A1* | 4/2015 | Moeglein | H04W 4/029 |
| | | | | 455/456.1 |
| 2015/0133173 | A1* | 5/2015 | Edge | G01S 1/66 |
| | | | | 455/456.6 |
| 2018/0063678 | A1 | 3/2018 | Zhu et al. | |
| 2018/0284149 | A1* | 10/2018 | Kommi | G01C 21/165 |
| 2018/0343048 | A1* | 11/2018 | Radulescu | H04B 7/0834 |
| 2018/0343056 | A1* | 11/2018 | Radulescu | H04B 7/2634 |

* cited by examiner

METHODS AND SYSTEMS FOR LOCATING A MOBILE DEVICE USING AN ASYNCHRONOUS WIRELESS NETWORK

RELATED APPLICATIONS

This application claims the benefit of U.S. Provisional Application No. 62/541,250, filed Aug. 4, 2017, entitled "LOCATION SUPPORT FOR AN ASYNCHRONOUS WIRELESS NETWORK", which is assigned to the assignee hereof, and incorporated by reference herein in its entirety.

BACKGROUND

1. Field

The subject matter disclosed herein relates to electronic devices, and more particularly to methods and apparatuses for use to support location of a mobile device using an asynchronous fifth-generation (5G) wireless network.

2. Information

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. It is expected that standardization for new fifth-generation (5G) wireless networks will include support for various positioning methods both new and existing, but issues may arise for positioning in asynchronous 5G networks with unknown relative transmission time differences between base stations. Embodiments disclosed herein address these issues by implementing techniques that enable accurate positioning for asynchronous wireless networks including asynchronous 5G wireless networks.

SUMMARY

Embodiments described herein are directed to performing position determination in asynchronous networks with unknown real time differences (RTDs) between base stations by combining Round Trip signal propagation Time (RTT) and Reference Signal Time Difference (RSTD) measurements to locate a mobile device that is accessing an asynchronous network and that only interacts with a serving base station. Techniques use a combination of RSTD measurements for one or more pairs of base stations, an RTT measurement for the serving base station and measurements of RTDs by the base stations.

An example method of locating a User Equipment (UE) at a first base station, according to the description, comprises measuring a first time of arrival (TOA) of a first reference signal received from a second base station, determining a first RTD between a first transmission from the first base station and a second transmission from the second base station, based at least in part on the first TOA, and measuring a second TOA of an uplink signal received from the UE. The method further comprises determining a first RTT between the first base station and the UE based at least in part on the second TOA, receiving a first RSTD for the first base station and the second base station from the UE, and sending location information for the UE to a location-capable device, wherein the location information is based at least in part on the first RTD, the first RTT, and the first RSTD.

The example method may comprise one or more the following features. The method may further comprise determining a location of the UE based at least in part on the first RTD, the first RTT, and the first RSTD, wherein the location information comprises the determined location of the UE. The location-capable device may determine the location of the UE based at least in part on the location information. The location-capable device may comprise a Location Management Function (LMF), a base station different from the first base station, or a location server in a radio access network. The first reference signal may comprise a Positioning Reference Signal (PRS), a Tracking Reference Signal (TRS), or a Cell-specific Reference Signal (CRS). The first and second base stations may comprise an evolved Node B (eNB) for Long Term Evolution (LTE), a next generation eNB (ng-eNB) for LTE or a New Radio (NR) Node B (gNB) for Fifth Generation (5G) NR. The first base station may comprise a serving base station for the UE. The method may further comprise broadcasting a second reference signal and receiving a timing measurement from the UE for the second reference signal, wherein the first RTT is further determined based at least in part on the timing measurement. The second reference signal may comprise a Positioning Reference Signal, a Tracking Reference Signal or a Cell-specific Reference Signal. The timing measurement may comprise a TOA measurement or a measurement of a transmit time-receive time difference at the UE. Determining the RTD may further comprise determining a second RTT between the first base station and the second base station. The method may further comprise measuring a third time of arrival (TOA) of a third reference signal received from a third base station, determining a second RTD between a third transmission from the first base station and a fourth transmission from the third base station, based at least in part on the third TOA, and receiving a second RSTD for the first base station and the third base station from the UE, wherein the location information for the UE is further based at least in part on the second RTD and the second RSTD. The method may further comprise determining the location of the UE based at least in part on the first RTD, the first RTT, the first RSTD, the second RTD, and the second RSTD, wherein the location information comprises the determined location of the UE.

An example method of locating a User Equipment (UE) at the UE comprises measuring a time of arrival (TOA) for a first reference signal received from a first base station, determining a Round Trip signal propagation Time (RTT) between the first base station and the UE based at least in part on the TOA, and measuring a first Reference Signal Time Difference (RSTD) between a second reference signal for the first base station and a third reference signal for a second base station. The method further comprises receiving a first real time difference (RTD) between the first base station and the second base station, and determining a location of the UE, based at least in part on the RTT, the first RSTD, and the first RTD.

The method may further comprise one or more of the following features. The first RTD may be received from the first base station or from a Location Management Function (LMF). Each of the first reference signal, the second reference signal, and the third reference signal may be a Positioning Reference Signal, a Tracking Reference Signal, or a Cell-specific Reference Signal. The first reference signal and the second reference signal may comprise the same reference signal. The first base station and the second base station may comprise an evolved Node B (eNB) for Long Term Evolution (LTE), a next generation eNB (ng-eNB) for LTE or a New Radio (NR) Node B (gNB) for Fifth Generation (5G) NR. The first base station may comprise a serving base station for the UE. The method may further comprise sending an uplink signal to the first base station and receiving a timing measurement for the uplink signal from the first base station, where the RTT is further determined based at least in part on the timing measurement. The timing measurement may comprise a TOA measurement or a measurement of a transmit time-receive time difference at the first base station. The method may further comprise measuring a second RSTD between a fourth reference signal for the first base station and a fifth reference signal for a third base station and receiving a second RTD between the first base station and the third base station, wherein determining the location of the UE is further based at least in part on the second RSTD and the second RTD. The second reference signal and the fourth reference signal may be the same reference signal.

An example base station, according to the description, comprises a wireless communication interface, a memory, and a processing unit communicatively coupled with the wireless communication interface and the memory. The processing unit is configured to measure, with the wireless communication interface, a first time of arrival (TOA) of a first reference signal received from a second base station, determine a first Real Time Difference (RTD) between a first transmission from the base station and a second transmission from the second base station, based at least in part on the first TOA, and measure, with the wireless communication interface, a second TOA of an uplink signal received from a User Equipment (UE). The processing unit is further configured to determine a first Round Trip signal propagation Time (RTT) between the base station and the UE based at least in part on the second TOA, receive, with the wireless communication interface, a first Reference Signal Time Difference (RSTD) for the base station and the second base station from the UE, and send, with the wireless communication interface, location information for the UE to a location-capable device, wherein the location information is based at least in part on the first RTD, the first RTT, and the first RSTD.

The base station may comprise one or more the following features. The processing unit may be further configured to determine a location of the UE based at least in part on the first RTD, the first RTT, and the first RSTD, wherein the location information comprises the determined location of the UE. The base station may comprise an evolved Node B (eNB) for Long Term Evolution (LTE), a next generation eNB (ng-eNB) for LTE or a New Radio (NR) Node B (gNB) for Fifth Generation (5G) NR. The base station may comprise a serving base station for the UE.

An example UE, according to the description, comprises a wireless communication interface, a memory, and a processing unit communicatively coupled with the wireless communication interface and the memory. The processing unit is configured to measure, using the wireless communication interface, a time of arrival (TOA) for a first reference signal received from a first base station, determine a Round Trip signal propagation Time (RTT) between the first base station and the UE based at least in part on the TOA, and measure, using the wireless communication interface, a first Reference Signal Time Difference (RSTD) between a second reference signal for the first base station and a third reference signal for a second base station. The processing unit is further configured to receive, using the wireless communication interface, a first real time difference (RTD) between the first base station and the second base station, and determine a location of the UE, based at least in part on the RTT, the first RSTD, and the first RTD.

The UE may further comprise one or more the following features. The processing unit may be further configured to send, using the wireless communication interface, an uplink signal to the first base station and receive, using the wireless communication interface, a timing measurement for the uplink signal from the first base station, where the processing unit further determines the RTT based at least in part on the timing measurement. The processing unit may be further configured to measure, using the wireless communication interface, a second RSTD between a fourth reference signal for the first base station and a fifth reference signal for a third base station and receive, using the wireless communication interface, a second RTD between the first base station and the third base station, where the processing unit determines the location of the UE further based at least in part on the second RSTD and the second RTD.

BRIEF DESCRIPTION OF DRAWINGS

Non-limiting and non-exhaustive aspects are described with reference to the following figures.

Figure 1:
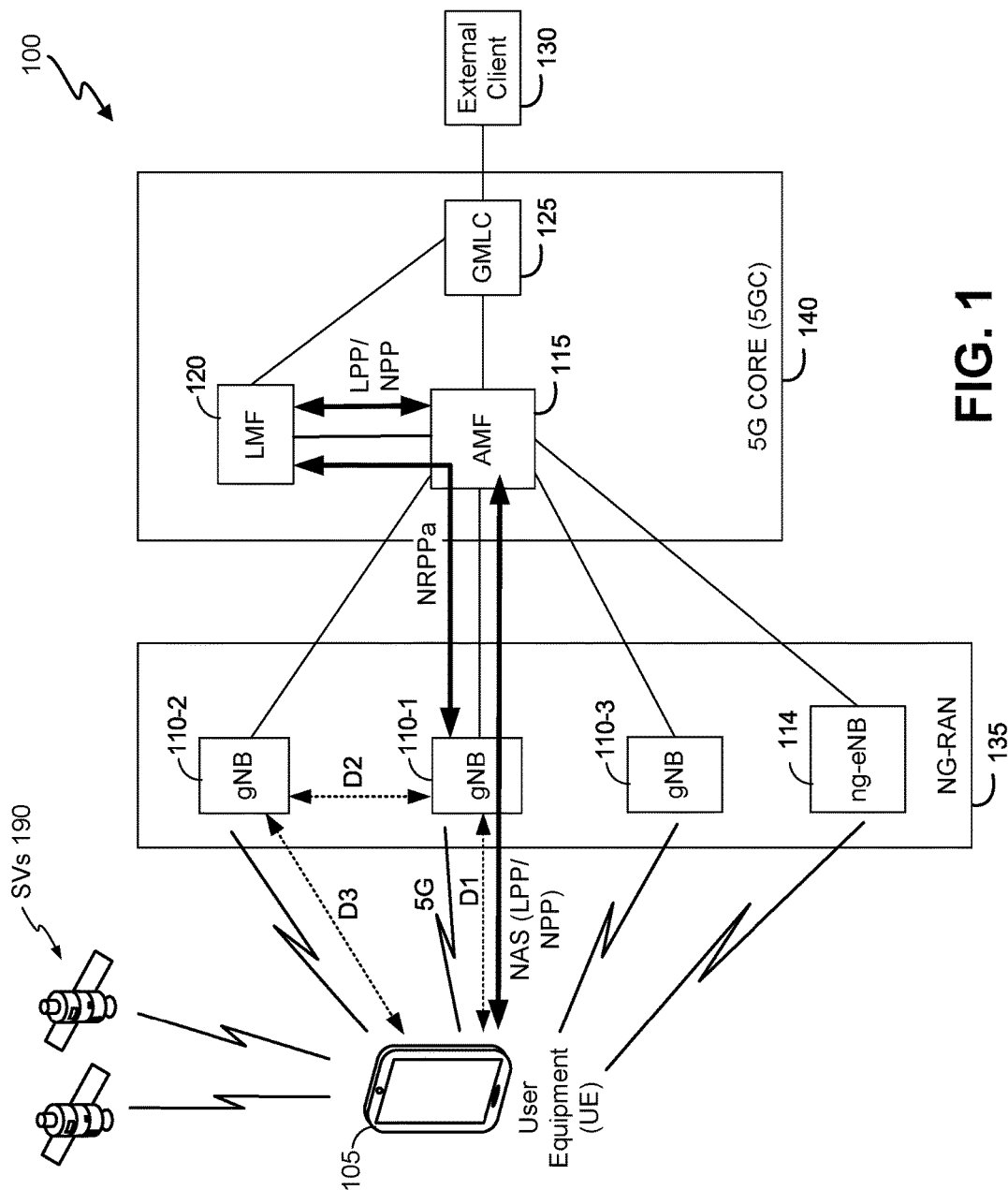
FIG. 1 is a diagram of a communication system that may utilize a 5G network to determine a position for a UE, according to an embodiment.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2 and 110-3).

DETAILED DESCRIPTION

Some example techniques for determining the location of a user equipment (UE) are presented herein, which may be implemented at the UE (e.g., a mobile device or mobile station), a location server (LS), a base station, and/or other devices. These techniques can be utilized in a variety of applications utilizing various technologies and/or standards, including 3rd Generation Partnership Project (3GPP), Open Mobile Alliance (OMA), 3GPP Long Term Evolution (LTE)

Positioning Protocol (LPP) and/or OMA LPP Extensions (LPPe), WiFi®, Global Navigation Satellite System (GNSS), and the like.

A UE may comprise a mobile device such as, a mobile phone, smartphone, tablet or other mobile computer, a portable gaming device, a personal media player, a personal navigation device, a wearable device, an in-vehicle device, or other electronic device. Position determination of a UE can be useful to the UE and/or other entities in a wide variety of scenarios. There are many methods already known to determine an estimated position of the UE, including methods that involve communicating measurement and/or other information between the UE and an LS.

It is expected that fifth-generation (5G) standardization will include support for positioning methods based on Observed Time Difference Of Arrival (OTDOA) and round-trip time (RTT). With OTDOA, a UE measures time differences, referred to as Reference Signal Time Differences (RSTDs), between reference signals transmitted by one or more pairs of base stations. The reference signals may be signals that are intended only for positioning which may be referred to as Positioning Reference Signals (PRS) or may be signals intended also for serving cell timing and frequency acquisition which may be referred to as Cell-specific Reference Signals (CRS) or Tracking Reference Signals (TRS). If a UE is able to measure three or more RSTDs between three or more corresponding different pairs of base stations (typically comprising a common reference base station in each pair and different neighbor base stations), the horizontal UE location can be obtained if the antenna locations and the relative timing of the base stations are known. Typically, knowing the relative timing of the base stations requires synchronizing the timing of each base station to a common absolute time using a Global Positioning System (GPS) or Global Navigation Satellite System (GNSS) receiver or using other means (e.g., GNSS receivers) to determine the association of base station timing to some absolute time.

FIG. 1 is a diagram of a communication system 100 that may utilize a 5G network to determine a position a UE 105 using OTDOA-based positioning methods, according to an embodiment. Here, the communication system 100 comprises a UE 105 and a 5G network comprising a Next Generation (NG) Radio Access Network (RAN) (NG-RAN) 135 and a 5G Core Network (5GC) 140, which, along with providing OTDOA-based positioning, may provide data and voice communication to the UE 105. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from GNSS satellite vehicles (SVs) 190. Additional components of the communication system 100 are described below. It will be understood that a communication system 100 may include additional or alternative components.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long Term Evolution (LTE), High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may enable the UE 105 to communicate with an external client 130 (e.g. via elements of 5GC 140 not shown in FIG. 1 or possibly via Gateway Mobile Location Center (GMLC) 125) and/or enable the external client 130 to receive location information regarding the UE 105 (e.g. via GMLC 125).

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise.

Base stations in the NG-RAN 135 may comprise NR Node Bs which are more typically referred to as gNBs. In FIG. 1, three gNBs are shown—gNBs 110-1, 110-2 and 110-3, which are collectively and generically referred to herein as gNBs 110. However, a typical NG RAN 135 could comprise dozens, hundreds or even thousands of gNBs 110. Pairs of gNBs 110 in NG-RAN 135 may be connected to one another (not shown in FIG. 1). Access to the 5G network is provided to UE 105 via wireless communication between the UE 105 and one or more of the gNBs 110, which may provide wireless communications access to the 5GC 140 on behalf of the UE 105 using 5G (also referred as NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135 (not shown in FIG. 1)—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit signals (e.g. PRS signals) and/or may broadcast assistance data to assist positioning of UE 105 but may not receive signals from UE 105 or from other UEs. It is noted that while only one ng-eNB 114 is shown in FIG. 1, the description below sometimes assumes the presence of multiple ng-eNBs 114.

As noted, while FIG. 1 depicts nodes configured to communicate according to 5G communication protocols, nodes configured to communicate according to other communication protocols, such as, for example, an LPP protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The methods and techniques described herein for support of UE 105 positioning may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE 105 accesses the NG-RAN 135 and may support position methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), and/or other position methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF) or value added LMF (VLMF). In some embodiments, a node/system that implements the LMF 120 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

As further illustrated in FIG. 1, the LMF 120 may communicate with the gNBs 110 and/or with the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (e.g. when used with measurements obtained by a gNB 110 or ng-eNB 114) and/or may be used by LMF 120 to obtain location related information from gNBs 110 and/or ng-eNBs 114, such as parameters defining PRS transmission from gNBs 110 and/or ng-eNB 114.

With a UE assisted position method, UE 105 may obtain location measurements and send the measurements to a location server (e.g. LMF 120) for computation of a location estimate for UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for gNBs 110, ng-eNB 114 and/or a WLAN access point (AP). The location measurements may also or instead include measurements of GNSS pseudorange, code phase and/or carrier phase for SVs 190. With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ or Time Of Arrival (TOA)) for signals transmitted by UE 105, and/or may receive measurements obtained by UE 105, and may send the measurements to a location server (e.g. LMF 120) for computation of a location estimate for UE 105.

Information provided by a gNB 110 and/or ng-eNB 114 to the LMF 120 using NRPPa may include timing and configuration information for PRS transmission from the gNB 110 and/or location coordinates for the gNB 110. The LMF 120 can then provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, and/or OTDOA (or some other position method). In the case of OTDOA, the LPP or NPP message may instruct the UE 105 to obtain one or more measurements (e.g. RSTD measurements) of PRS signals transmitted within particular cells supported by particular gNBs 110 and/or the ng-eNB 114 (or supported by some other type of base station such as an eNB or WiFi AP). An RSTD measurement may comprise the difference in the times of arrival at the UE 105 of a signal (e.g. a PRS signal) transmitted or broadcast by one gNB 110 and a similar signal transmitted by another gNB 110. The UE 105 may send the measurements back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 150 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

In a synchronized network, the transmission timing of gNBs 110 may be synchronized such that each gNB 110 has the same transmission timing as every other gNB 110 to a high level of precision—e.g. 50 nanoseconds or less. Alternatively, the gNBs 110 may be synchronized at a radio frame or subframe level such that each gNB 110 transmits a radio frame or subframe during the same time duration as every other gNB 110 (e.g. such that each gNB 110 starts and finishes transmitting a radio frame or subframe at almost precisely the same times as every other gNB 110), but does not necessarily maintain the same counters or numbering for radio frames or subframes. For example, when one gNB 110 is transmitting a subframe or radio frame with counter or number zero (which may be the first radio frame or subframe in some periodically repeated sequence of radio frames or subframes), another gNB 110 may be transmitting a radio frame or subframe with a different number or counter such as one, ten, one hundred etc.

Synchronization of the transmission timing of ng-eNBs 114 in NG-RAN 135 may be supported in a similar manner to synchronization of gNBs 110, although since ng-eNBs 114 may typically use a different frequency to gNBs 110 (to avoid interference), an ng-eNB 114 may not always be synchronized to gNBs 110. Synchronization of gNBs 110 and ng-eNBs 114 may be achieved using a GPS receiver or a GNSS receiver in each gNB 110 and ng-eNB 114 or by other means such as using the IEEE 1588 Precision Time Protocol. However, synchronization may add to the complexity and cost of a network. In contrast, in an asynchronous network, the timing of each gNB 110 and ng-eNB 114 may be independent of the timing of every other gNB 110 and ng-eNB or may be only approximately synchronized—e.g. with an accuracy of only 10-100 microseconds.

With synchronized gNBs 110 (or ng-eNBs 114), time differences (e.g. RSTDs) measured by a UE 105 between a pair of gNBs 110 (or a pair of ng-eNBs 114) may be exactly proportional to the difference in the distances of the UE 105 from each gNB 110 (or each ng-eNB 114) in the pair of gNBs 110 (or ng-eNBs 114) which may simplify position determination for the UE 105. For example, the location of UE 105 may be obtained using trilateration or multilateration techniques based on RSTD measurements obtained by UE 105. In contrast with asynchronous gNBs 110 (or ng-eNBs 114), time differences (e.g. RSTDs) measured by a UE 105 between pairs of gNBs 110 (or ng-eNBs 114) may not be useful for positioning of the UE 105 without additional information such as the actual real time difference (RTD) between the timing of each of the pairs of gNBs 110 (or each pair of ng-eNBs 114).

To illustrate position methods for an asynchronous network, distances between various components are provided in FIG. 1. In particular, distance D1 is the distance between gNB 110-1 (e.g. an antenna of gNB 110-1) and the UE 105, distance D2 is the distance between gNB 110-1 and gNB 110-2, and distance D3 is the distance between gNB 110-2 (e.g. an antenna of gNB 110-2) and UE 105. It can be noted that while the timing diagrams illustrated in FIGS. 2-4 (and discussed in more detail below) apply to gNBs 110 in NG-RAN 135, similar or identical timing diagrams may be defined and evaluated for ng-eNBs 114 or for eNBs in an E-UTRAN, as will be evident to those with ordinary skill in the art.

Positioning of UE 105 may be supported using various measurements such measurements of a round trip signal propagation time (RTT) between UE 105 and one or more gNBs 110 and/or measurements of an RSTD by UE 105 between a pair of gNBs 110. RTT-based position determination can be used if the RTT is measured between the UE 105 and two, or more commonly at least three, different gNBs 110. Each RTT between the UE 105 and a gNB 110 can be used to determine the distance between the UE 105 and the gNB from the value of (RTT c/2), where c is the radio signal speed (typically the speed of light). The UE 105 location can then be obtained from the intersection point of circles centered at the antenna for each gNB 110 for which an RTT with UE 105 was obtained, where the radius of each circle is given by the distance between the UE 105 and the antenna for each gNB 110 as determined from the RTT. In this case, a unique horizontal location of the UE 105 may be obtained using the RTT for just two gNBs 110 from the intersection of two circles if one of the two intersection points (when there are two intersection points and not just one or none) but not the other is consistent with an already known approximate location for the UE 105, as obtained for example from the known serving cell for the UE 105. However, to avoid having to resolve an ambiguity with two intersection points, it may be more common to measure at least three RTTs and obtain the UE 105 location from the single common intersection point of all the circles (or from a small common area through which all the circles pass in the case that measurement errors do not provide a single precise intersection point).

Problematically, however, the RTT must be measured between the UE 105 and at least two (and more normally at least three) gNBs 110. This is not always possible in cellular networks because a UE 105 normally interacts only with its serving gNB 110 (e.g., gNB 110-1 in FIG. 1) and not with other non-serving gNBs (e.g., gNBs 110-2 and 110-3) except during handover or cell change procedures. In some cases, a UE 105 may be allowed to access additional gNBs 110 to support soft handover but this would not apply when the UE 105 is in idle state and only accessing the network briefly for mobility management support or when soft handover is not defined for a wireless technology or not supported by a UE 105 or by a network.

With regard to positioning using OTDOA based on RSTD measurements, as already discussed, position determination of the UE 105 would require either synchronization of the gNBs 110 or knowledge obtained in some other way of the RTDs between pairs of gNBs 110. As a result, OTDOA positioning is typically not usable when gNBs 110 are asynchronous with unknown RTDs.

Figure 2:
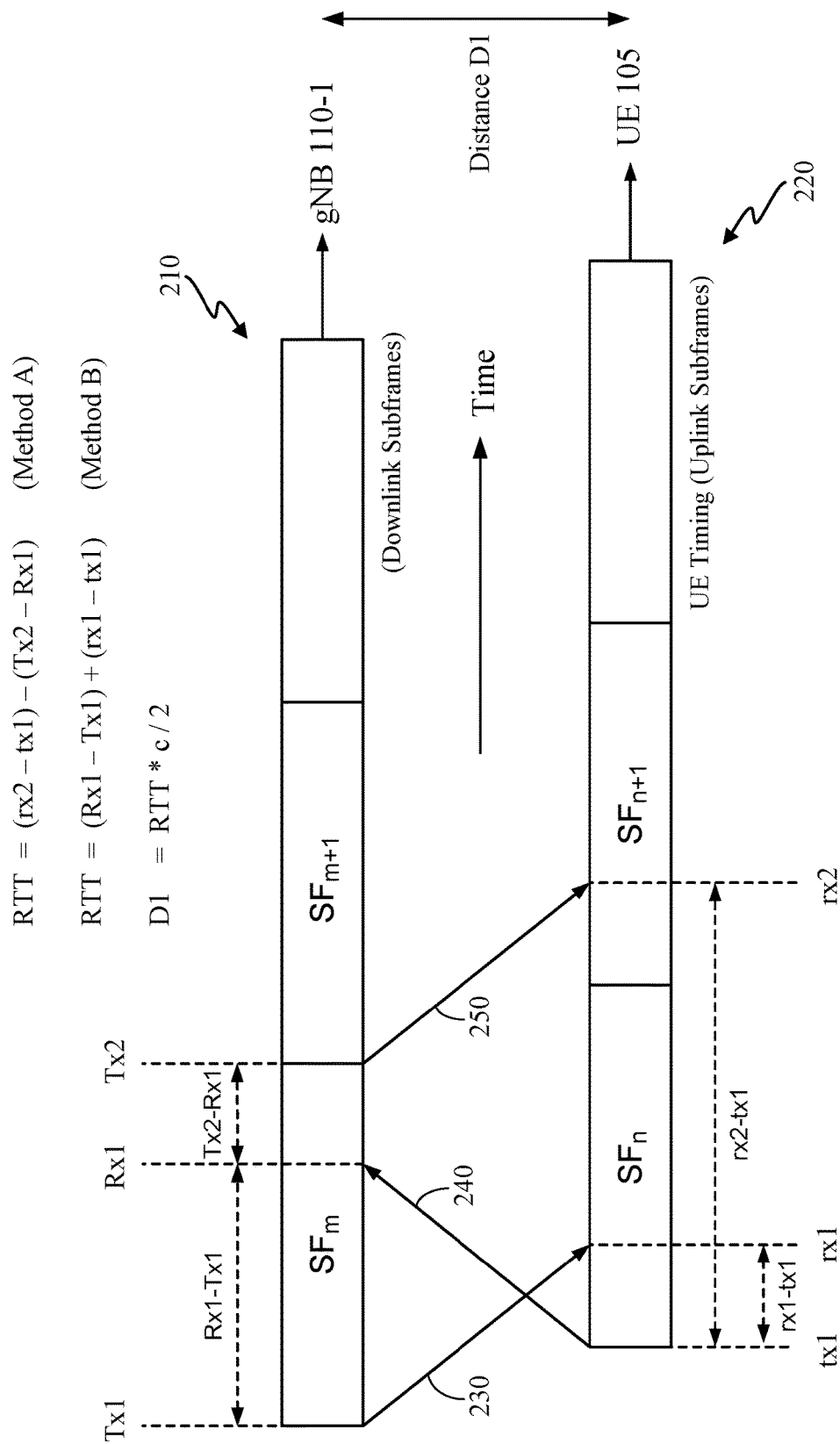
FIG. 2 is a timing diagram, illustrating how Round Trip Time (RTT) may be measured between a serving gNB and a UE, according to an embodiment.
Figure 3:
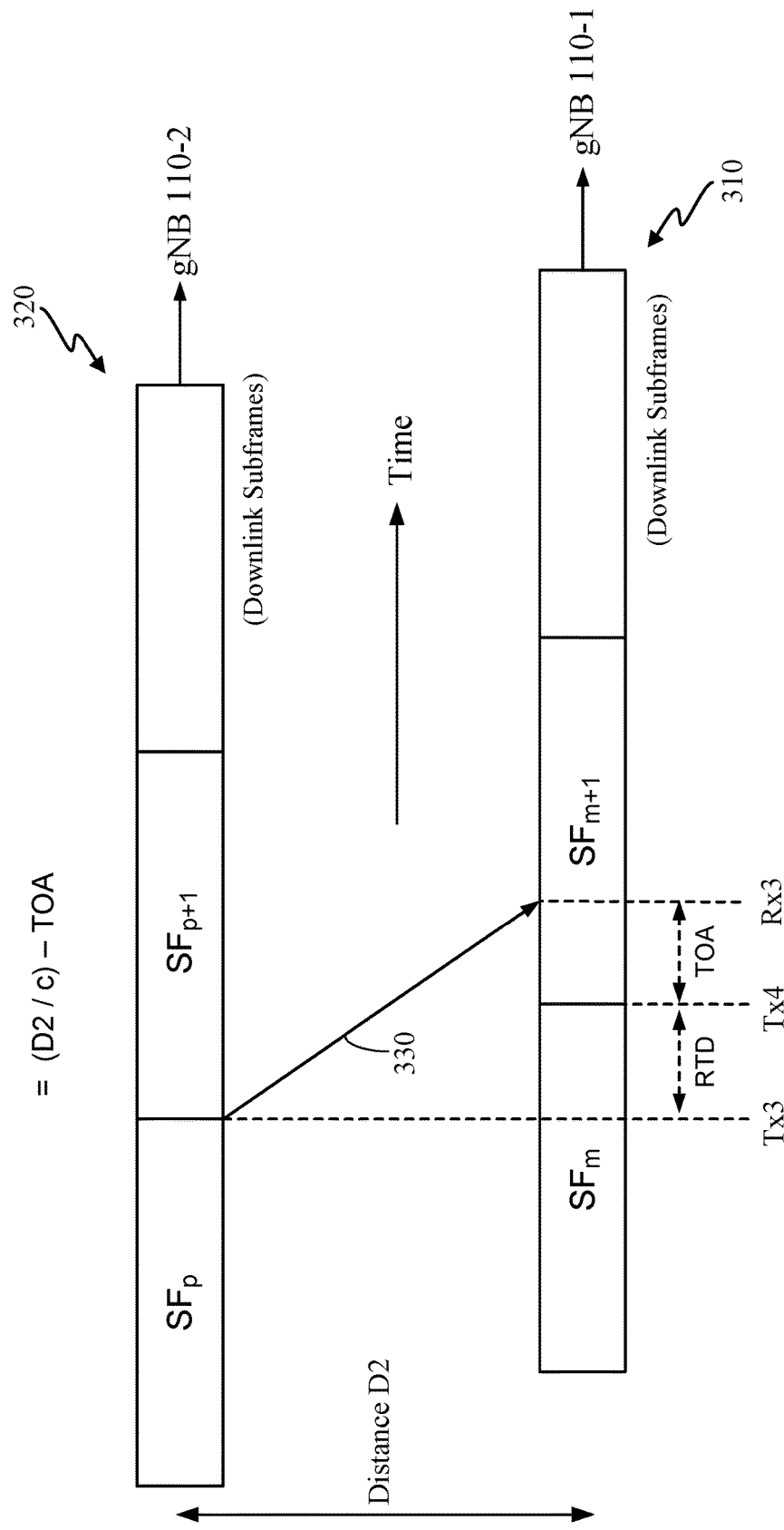
FIG. 3 is a timing diagram, illustrating how Real Time Difference (RTD) may be measured between gNBs, according to an embodiment.
Figure 4:
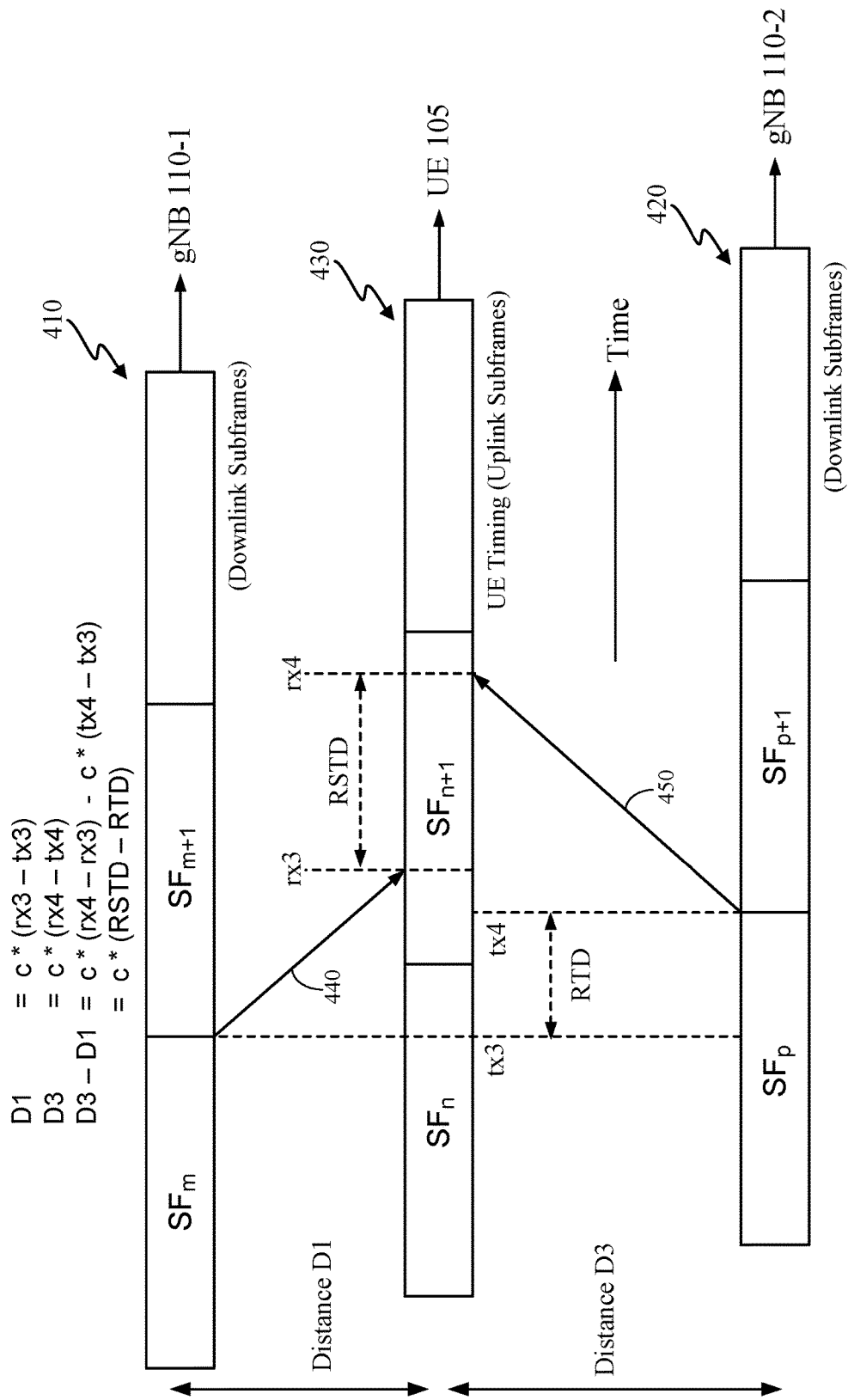
FIG. 4 is a timing diagram, illustrating how a distance may be determined between a UE and a non-serving gNB, according to an embodiment.

According to embodiments described herein below, techniques may perform position determination in asynchronous 5G networks with unknown RTDs by combining RTT and RSTD measurements to locate a UE 105 that is accessing an asynchronous network and that only interacts with a serving gNB 110-1. The method uses a combination of RSTD measurements for one or more pairs of gNBs 110, one RTT measurement for the serving gNB 110-1 and measurements of RTDs by the gNBs 110. FIGS. 2-4 illustrate how RTT, RTD and RSTD measurements can be made, and the method that combines these measurements is described in further detail below.

FIG. 2 is a timing diagram, illustrating how an RTT may be measured and subsequently used to determine the distance D1 between the serving gNB 110-1 and the UE 105, according to an embodiment. In FIG. 2, time is represented horizontally with time increasing from left to right whereas distance is represented vertically. FIG. 2 is, of course, an illustration and does not capture all aspects of time and distance in relation to UE 105 and gNB 110-1, though it does show key aspects involved in RTT measurement. FIG. 2 shows a sequence of downlink subframes 210 transmitted by gNB 110-1. The downlink subframes 210 may be as defined for LTE or 5G NR and may correspond to subframes (or radio frames or other physical layer radio structures) transmitted for 5G NR. As an example, in the case of LTE, each subframe may have a duration of exactly 1 millisecond (ms). In some embodiments, the subframes may be subframes for a PRS, CRS or TRS.

FIG. 2 also shows a sequence of uplink subframes 220 that may be transmitted by UE 105. The uplink subframes 220 may be as defined for LTE and/or may correspond to subframes (or radio frames or other physical layer radio structures) transmitted for 5G NR. As an example, in the case of LTE, each subframe may have a duration of exactly 1 millisecond (ms). Since the UE 105 may not be transmitting continuously but only sporadically, the uplink subframe timing 220 shown in FIG. 2 may simply be maintained by UE 105 without transmitting at each time instant and may be used whenever UE 105 does perform uplink transmission. In some implementations, UE 105 may lock its transmission timing to timing received from the serving gNB 110-1 such that UE 105 timing runs at the same rate as the timing at gNB 110-1, though not necessarily with the timing being exactly the same. Thus, for example, uplink radio frames or subframes 220 transmitted (or for which time is maintained) by UE 105 may not drift relative to downlink transmission timing 210 at gNB 110-1 but may not start and/or end at exactly the same times as at gNB 110-1. Furthermore, UE 105 may receive a timing advance value from gNB 110-1 which tells UE 105 how far in advance of the timing 210 of gNB 110-1 that is received at UE 105 the UE 105 uplink timing 220 should be set.

As illustrated in FIG. 2, the downlink transmission 210 comprises consecutive subframes (SFs) labelled as $SF_m$, $SF_{m+1}$, etc., where subframe $SF_m$ may be a subframe with subframe number m. Similarly, the uplink transmission 220 comprises consecutive SFs labelled as $SF_n$, $SF_{n+1}$, etc. (e.g. where subframe $SF_n$ may be a subframe with subframe number n).

To measure the RTT, the UE 105 may measure the time of arrival (TOA), relative to the uplink timing 220 of the UE 105, of the start of some downlink subframe received from gNB 110-1. Similarly, gNB 110-1 may measure the time of arrival (TOA), relative to the downlink timing 210 of the gNB 110-1, of the start of some uplink subframe received from UE 105. In detail this may occur as follows where references to "UE 105 time" refer to uplink timing 220 and references to "gNB 110-1 time" refer to downlink timing 210.

At gNB 110-1 time Tx1, the start of $SF_m$ is transmitted by gNB 110-1, following a transmission path 230 until it is received by the UE 105 at UE 105 time rx1. (Here, transmission path 230 is represented by an angled line that illustrates both the passage of time (horizontally) and distance traveled (vertically).) Similarly, at UE 105 time tx1, the start of $SF_n$ is transmitted by UE 105, following a transmission path 240 until it is received by gNB 110-1 at gNB 110-1 time Rx1. Further, at gNB 110-1 time Tx2, the start of $SF_{m+1}$ is transmitted by gNB 110-1, following a transmission path 250 until it is received by UE 105 at UE 105 time rx2 (which, in this example, is received sometime during the transmission of $SF_{n+1}$ by the UE 105). It can be noted that the relationship between the timing of the downlink transmission 210 and the uplink transmission 220 can vary in different scenarios. For example, in some scenarios, time rx1 may precede time tx1. (The techniques and equations for measuring RTT described below still apply in such scenarios nonetheless.)

An RTT is a measurement of the time it takes for a transmission to travel from a first entity to a second entity, and then back from the second entity to the first entity. Therefore, in FIG. 2, the RTT between UE 105 and gNB 110-1 is a sum of time it takes for a transmission to follow transmission path 240 plus the time it takes for a transmission to follow either transmission path 230 or transmission path 250. With this in mind, and as further illustrated in FIG. 2, RTT may be measured by using one of at least two methods.

In a first method (Method A), RTT may be calculated as the sum of time it takes for a transmission to follow transmission path 240 plus the time it takes for transmission to follow transmission path 250. The calculation therefore takes the duration between rx2 and tx1 and subtracts the duration between Tx2 and Rx1. That is:

$$RTT=(rx2-tx1)-(Tx2-Rx1). \quad (1)$$

More exactly for Method A, the gNB 110-1 may determine the time interval from receipt of the start of an uplink subframe (e.g. for the transmission 240) received from the UE 105 until the start of the next downlink subframe (e.g. the transmission 250) from the gNB 110-1, which equals Tx2−Rx1 in FIG. 2. Similarly, the UE 105 may determine the time interval from transmission of the start of an uplink subframe (e.g. for the transmission 240) until the receipt of the next downlink subframe from gNB 110-1 (e.g. the transmission 230), which equals rx1−tx1 in FIG. 2. This time is adjusted by increasing it by one subframe duration (which increases the time interval to rx2−tx1) if it is less than the time interval (Tx2−Rx1) determined by gNB 110-1. This adjustment may be valid so long as the distance between the UE 105 and serving gNB 110-1 is less than the distance traveled by a radio signal in half the subframe duration (which would be approximately 150 kms with a 1 ms subframe duration and would be applicable in most cellular wireless networks). Equation (1) is then applied with the term (rx2−tx1) in equation (1) replaced by the term (rx1−tx1) when the adjustment is not made. Equation (1) may be applied at the UE 105, at the gNB 110-1 or at the LMF 120, provided the measurements needed for equation (1) are available (e.g. are provided).

It is noted that each of the time intervals Tx2−Rx1, rx1−tx1 and rx2−tx1 described above may be referred to as a TOA or as a "receive time-transmit time difference" (or "transmit time-receive time difference"). This naming convention can apply to all other time intervals described below that comprise the difference between the time that a signal is received at an entity (e.g. the UE 105 or a gNB 110) and the time that another signal is transmitted by the entity.

In a second method (Method B), the RTT between UE 105 and gNB 110-1 is calculated as the sum of time it takes for a transmission to follow transmission path 240 plus the time it takes for transmission to follow transmission path 230. The calculation therefore takes the duration between Rx1 and Tx1 and adds the duration between rx1 and tx1. The equation therefore is as follows:

$$RTT=(Rx1-Tx1)+(rx1-tx1). \quad (2)$$

More exactly for Method B, the gNB 110-1 may determine the time interval from the start of a downlink subframe (e.g. for transmission 230) until receipt of the start of the next uplink subframe received from UE 105 (e.g. for the transmission 240), which equals Rx1−Tx1 in FIG. 2. Similarly, the UE 105 may determine the time interval from transmission of the start of an uplink subframe (e.g. for the transmission 240) until the receipt of the next downlink subframe from gNB 110-1 (e.g. the transmission 230), which equals rx1−tx1 in FIG. 2. The RTT may then be obtained using equation (2). When rx1 occurs before tx1 in FIG. 2, UE 105 would measure rx2−tx1 (since the measurement is for the next received downlink subframe after tx1) which would be used in equation (2) instead of rx1−tx1. In this case, the RTT from equation (2) could exceed one subframe duration and would then need to be adjusted by a reduction of one subframe duration. As for method A, this adjustment may be valid so long as the distance between the UE 105 and serving gNB 110-1 is less than the distance traveled by a radio signal in half the subframe duration (which would be approximately 150 kms with a 1 ms subframe duration and would be applicable in most cellular wireless networks). Equation (2) may be applied at the UE 105, at the gNB 110-1 or at the LMF 120 provided the measurements needed for equation (2) are available (e.g. are provided).

Once the RTT is calculated, the distance D1 between the serving gNB 110-1 and UE 105 can be determined by:

$$D1 = \frac{RTT*c}{2}. \quad (3)$$

A variant of the method illustrated in FIG. 2 may also be used to determine an RTT and a distance between two gNBs 110. For example, to determine an RTT and the distance D2 between gNB 110-1 and gNB 110-2, UE 105 in FIG. 2 may be replaced by gNB 110-2. In this case, the uplink subframes 220 shown in FIG. 2 may represent downlink subframes transmitted by gNB 110-2 and the transmission path 240 in FIG. 2 may show the transmission path to gNB 110-1 for the start of a downlink subframe $SF_n$ transmitted from gNB 110-2. The methods A and B described previously can then be applied with these differences to obtain the RTT and the distance D2 between gNB 110-1 and gNB 110-2, where the RTT obtained using equation (1) or equation (2) is used in equation (3) to obtain a value for the distance D2 instead of the distance D1.

FIG. 3 is a timing diagram, illustrating how a Real Time Difference (RTD) may be measured between gNBs 110, according to an embodiment. RTD is a measurement to determine the difference between the downlink timing of the gNBs 110, which can be used for positioning as described in more detail below. In FIG. 3, the particular gNBs 110 involved are the serving gNB 110-1 and a second gNB 110-2, where the distance between these gNBs is distance D2. Similar to FIG. 2, time in FIG. 3 is represented horizontally with time increasing from left to right whereas distance is represented vertically. FIG. 3 shows a sequence of downlink subframes 310 transmitted by gNB 110-1 and a sequence of downlink subframe 320 transmitted by gNB 110-2. The downlink subframes 310 and 320 may be as defined for LTE or 5G NR and may correspond to subframes (or radio frames or other physical layer radio structures) transmitted for 5G NR. As an example, in the case of LTE, each subframe may have a duration of exactly 1 millisecond (ms). In some embodiments, the subframes may be subframes for a PRS, CRS or TRS.

As illustrated in FIG. 3, the downlink subframes 310 transmitted from gNB 110-1 comprise consecutive subframes (SFs) labelled as $SF_m$, $SF_{m+1}$, etc., where subframe $SF_m$ may be a subframe with subframe number m. Similarly, the downlink subframes 320 transmitted from gNB 110-2 comprises consecutive SFs labelled as $SF_p$, $SF_{p+1}$, etc. (e.g. where subframe $SF_p$ may be a subframe with subframe number p).

In contrast to FIG. 2, which included the UE 105 having an unknown position, both entities in FIG. 3 may have known positions. That is, both the location of the serving gNB 110-1 and the location of the second gNB 110-2 may be known. And thus, distance D2 can be known. (That said, in scenarios in which distance D2 might not be known, this can be determined using an RTT measurement similar to the process illustrated in FIG. 2 and described above.) With a known distance D2, RTD may be determined as follows, where references to "gNB 110-1 time" refer to downlink timing 310 and references to "gNB 110-2 time" refer to downlink timing 320.

At gNB 110-1 time Tx3, gNB 110-2 transmits the start of $SF_{p+1}$. This travels along transmission path 330 and is received by gNB 110-1 at gNB 110-1 time Rx3. Meanwhile, at gNB 110-1 time Tx4, gNB 110-1 transmits the start of $SF_{m+1}$. (Again, it will be appreciated that the timing difference between downlink subframes 310 and downlink subframes 320 may vary by scenario. And again, the equations and techniques described herein may apply in any case.) GNB 110-1 then measures the time of arrival (TOA) of the transmission 330 relative to its own timing which is Rx3−Tx4 as shown in FIG. 3. More precisely, gNB 110-1 measures the TOA of the start of the first downlink subframe received from gNB 110-2 following the start of transmission of a downlink subframe at gNB 110-1—which corresponds to the time Rx3−Tx4 shown in FIG. 3. The RTD between gNB 110-1 and gNB 110-2 is the difference in the transmission timing of the two gNBs 110 and can be characterized by the difference in transmission times between the start of one subframe at gNB 110-2 and the start of the immediately following subframe at gNB 110-1. As shown in FIG. 3, the RTD is given by Tx4−Tx3. The following equations then show how the RTD may be obtained from the measured TOA.

$$\begin{aligned} RTD &= Tx4 - Tx3 \\ &= (Rx3 - Tx3) - (Rx3 - Tx4) \\ &= \frac{D2}{c} - TOA \end{aligned} \quad (4)$$

In scenarios where equation (4) yields a negative RTD which may occur when Rx3 occurs before Tx4 in FIG. 3 and consequently when the TOA in equation (4) measures the time from the start of the previous subframe $SF_m$ to Rx3 in FIG. 3, equation (4) needs to be adjusted by adding one subframe duration to the value of RTD from equation (4). It is noted that RTD could also be characterized by the difference in transmission times between the start of one subframe at gNB 110-1 (rather than gNB 110-2) and the start of the immediately following subframe at gNB 110-2 (rather than gNB 110-1): such an RTD would equal one subframe duration minus the RTD obtained in equation (4).

FIG. 4 is a timing diagram, illustrating how the distance D3 between UE 105 and gNB 110-2 may be obtained from an RSTD measurement obtained by UE 105 for gNB 110-1 and gNB 110-2. In FIG. 4, it is assumed that an RTT between UE 105 and serving gNB 110-1 has been obtained (e.g. according to the procedure for FIG. 2) and that an RTD between gNB 110-1 and gNB 110-2 has been obtained (e.g. according to the procedure for FIG. 3). Similar to FIG. 2 and FIG. 3, time in FIG. 4 is represented horizontally with time increasing from left to right whereas distance is represented vertically. FIG. 4 shows a sequence of downlink subframes 410 transmitted by gNB 110-1, a sequence of downlink subframe 420 transmitted by gNB 110-2 and a sequence of uplink subframes 430 transmitted by UE 105. The downlink subframes 410 and 420 and the uplink subframes 430 may be as defined for LTE or 5G NR and may correspond to subframes (or radio frames or other physical layer radio structures) transmitted for 5G NR. As an example, in the case of LTE, each subframe may have a duration of exactly 1 millisecond (ms). In some embodiments, the downlink subframes may be subframes for a PRS, CRS or TRS.

Since the UE 105 may not be transmitting continuously but only sporadically, the uplink subframe timing 430 shown in FIG. 4 may simply be maintained by UE 105 without transmitting at each time instant and may be used whenever UE 105 does perform uplink transmission. In some implementations, UE 105 may lock its transmission timing to timing received from gNB 110-1 (or gNB 110-2) such that UE 105 timing runs at the same rate as the timing at gNB 110-1 (or gNB 110-2) though necessarily with the timing being exactly the same. Thus, for example, uplink radio frames or subframes 430 transmitted (or for which time is maintained) by UE 105 may not drift relative to downlink transmission timing 410 at gNB 110-1 (or relative to downlink transmission timing 420 at gNB 110-2) but may not start and/or end at exactly the same times as at gNB 110-1 (or gNB 110-2). Furthermore, UE 105 may receive a timing advance value from gNB 110-1 which tells UE 105 how far in advance of the timing 410 of gNB 110-1 that is received at UE 105 the UE 105 uplink time 430 should be set.

As illustrated in FIG. 4, the downlink subframes 410 from gNB 110-1 comprise consecutive subframes (SFs) labelled as $SF_m$, $SF_{m+1}$, etc., where subframe $SF_m$ may be a subframe with subframe number m. Similarly, the downlink subframes 420 from gNB 110-2 comprise consecutive SFs labelled as $SF_p$, $SF_{p+1}$, etc. (e.g. where subframe $SF_p$ may be a subframe with subframe number p). Similarly also, the uplink subframes 430 comprise consecutive SFs labelled as $SF_n$, $SF_{n+1}$, etc. (e.g. where subframe $SF_n$ may be a subframe with subframe number n). As with the previous figures, the relationships between the downlink and the uplink transmissions may vary, depending on the scenario.

The timing of events in FIG. 4 is as follows, where references to "gNB 110-1 time" refer to downlink timing 410, references to "gNB 110-2 time" refer to downlink timing 420 and references to "UE 105 time" refer to uplink timing 430. At UE 105 time tx3, the serving gNB 110-1 transmits the start of $SF_{m+1}$. This follows transmission path 440 and is received by UE 105 at UE 105 time rx3. In the meantime, at UE 105 time tx4, the gNB 110-2 transmits the start of $SF_{p+1}$. This follows transmission path 450 and is received by UE 105 at UE 105 time rx4. From the UE 105 perspective, the transmission of the start of $SF_{m+1}$ from gNB 110-1 arrives first at UE 105 time rx3 followed by the transmission of the start of $SF_{p+1}$ from gNB 110-2 which arrives at UE 105 time rx4. Furthermore, $SF_{p+1}$ is the start of the first subframe to be received from gNB 110-2 after receipt of the start of $SF_{m+1}$ from gNB 110-1. Consequently, the difference rx4–rx3 follows the normal conventions for an RSTD measurement (e.g. for OTDOA) and may be obtained by UE 105. In this scenario, the time difference (tx4–tx3) is the RTD between gNB 110-1 and gNB 110-2 (e.g. obtained as described for FIG. 3) and the time difference (rx3–tx3) is related to the distance D1 (e.g. obtained according to FIG. 2). This enables the distance D3 to be obtained from the RSTD measurement and the known RTD and distance D1 according the following equations.

$$D1 = c(rx3 - tx3), \quad (5)$$

$$D3 = c(rx4 - tx4). \quad (6)$$

This can be rewritten as:

$$D3 - D1 = c(rx4 - rx3) - c(tx4 - tx3), \quad (7)$$

$$= c(RTSD - RTD). \quad (8)$$

And thus, $$D3 = c(RSTD - RTD) + D1. \quad (9)$$

It is noted that RTD can be determined (e.g. defined) such that tx4 either follows, or occurs at the same time as, tx3 in FIG. 4 and thus where (tx4–tx3) in equation (7) is always non-negative. However, in some scenarios designated "S1" (e.g. which may occur if RTD is close to zero and D1 exceeds D3), rx4 may occur before rx3 in FIG. 4, in which case RSTD would be negative. In some other scenarios designated "S2" (e.g. which may occur if RTD is close to one subframe interval and D3 exceeds D1), rx4 may occur after rx3 by an amount greater than one subframe interval, in which case RSTD would exceed one subframe interval. If UE 105 measures RSTD as the interval following the arrival of the start of one subframe from gNB 110-1 until the arrival of the immediately following start of a subframe from gNB 110-2, UE 105 will always measure RSTD as a non-negative value between zero and one subframe interval. Hence, for scenarios "S1", the measured RSTD would be one subframe interval greater than the (correct) negative RSTD value for equations (5) to (9), whereas for scenarios "S2", the measured RSTD would be one subframe interval less than the (correct) positive RSTD value (greater than one subframe interval) for equations (5) to (9). In equation (9), this would result in a value for D3 that was approximately 300 kilometers too high for scenarios "S1" and approximately 300 kilometers (kms) too low for scenarios "S2". However, provided equations (5) to (9) are applied only to gNBs 110 for which the difference in the distances D1 and D3 to the UE 105 is less than M kms, the errors may be corrected by reducing a measured RSTD value by one subframe interval when the value of D3 would otherwise exceed M kms and increasing a measured RSTD value by one subframe interval when the value of D3 in equation (9) would otherwise be less than minus M kms. Here, M is the exact distance traveled by a radio signal over a half a subframe duration which is approximately 150 kms. The condition may be satisfied for example, if equations (5) to (9) are applied only to gNBs 110 that lie within a circle of radius 150 kms centered at the serving gNB 110-1 for UE 105 (assuming that equation (9) is used only to obtain the UE 105 distance D3 to various non-serving gNBs 110, based on the distance D1 to the serving gNB 110-1). For most networks, this condition should not be limiting as cellular signals are not normally transmitted and received over a distance of more than around 50 kms.

Once the distances D1 and D3 are known, a location of the UE 105 can be determined as described previously from the intersection of two circles around the antennas of gNB 110-1 and gNB 110-2 with radii D1 and D3, respectively. It can be further noted that a distance between the UE 105 and other gNBs (e.g., gNB 110-3 in FIG. 1) can be determined by a process similar to that described for FIG. 4, which may also be used to determine the location of the UE 105 and, for example, improve the accuracy of the location of UE 105.

Figure 5:
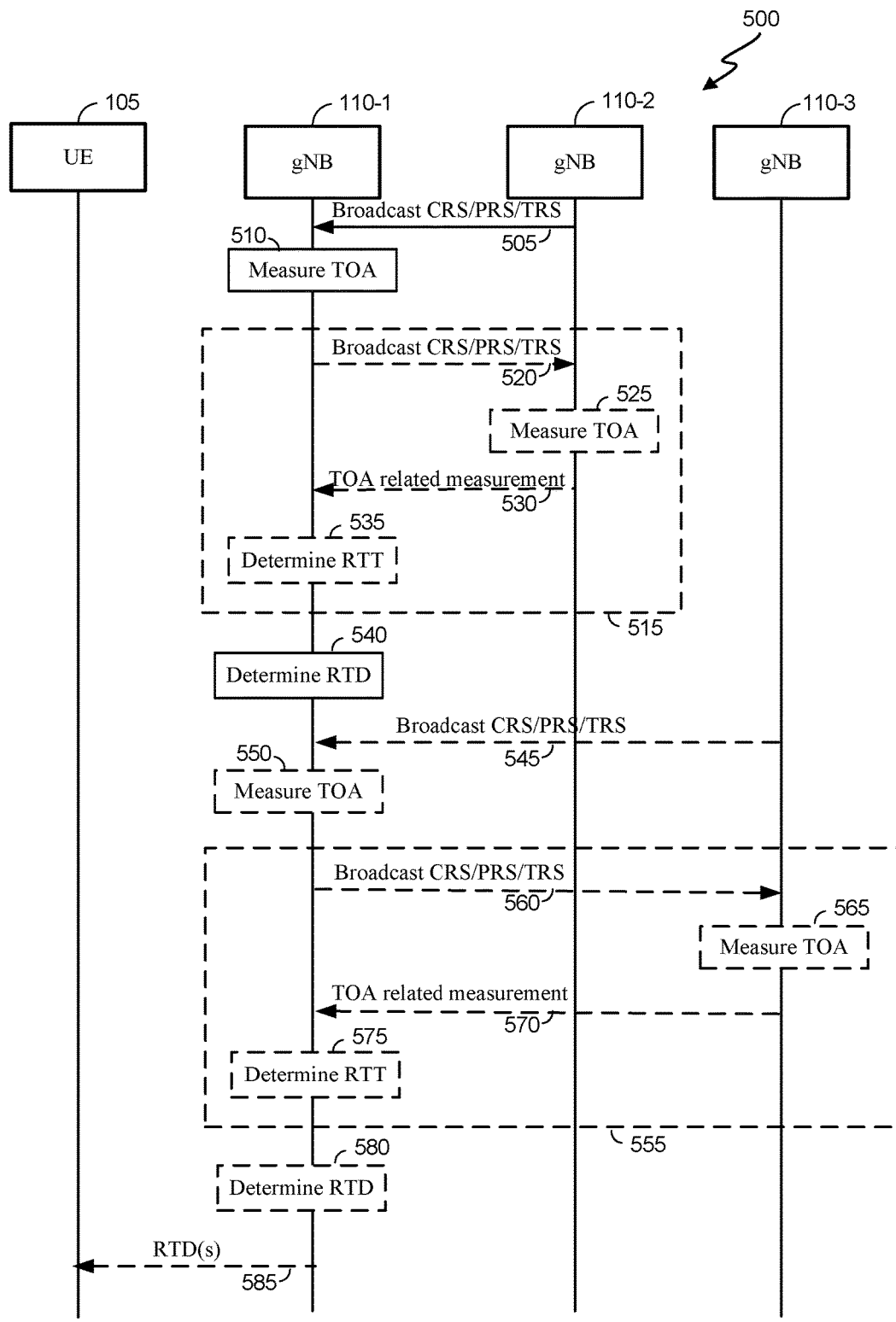
FIGS. 5-7 are signal flow diagrams illustrating methods for determining a location of a UE, according to various embodiments.
Figure 6:
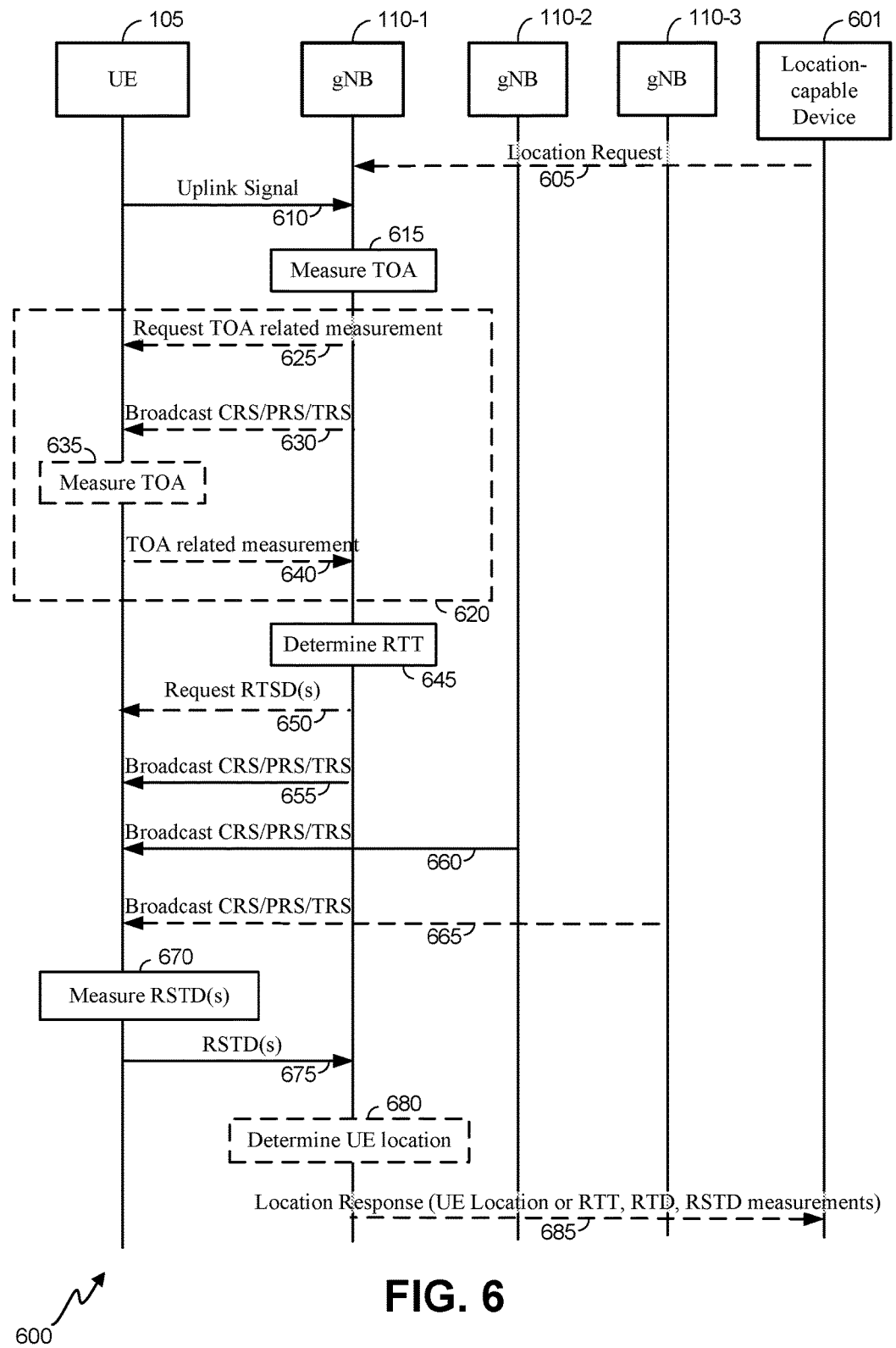
Figure 7:
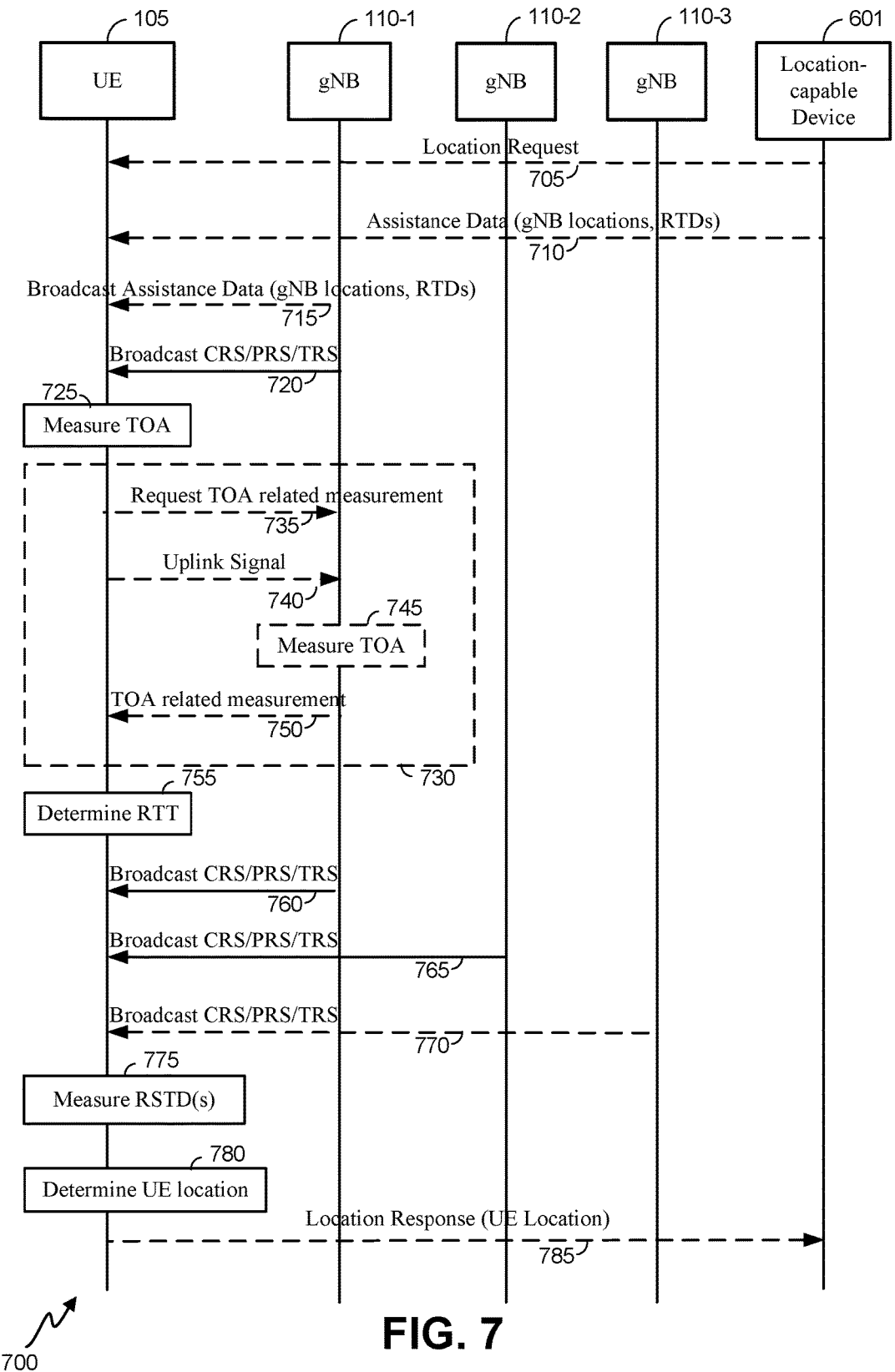

FIGS. 5-7 are signaling flow diagrams illustrating methods for determining a location of the UE 105, according to various embodiments, based on the principles described above and illustrated in FIGS. 2-4. Signaling flows similar to FIGS. 5-7 involving ng-eNBs 114 or eNBs rather than gNBs 110 will be readily apparent to those with ordinary skill in the art. It is noted that the signaling requirement for these methods can be small. For network location determination, it may be only required that the UE 105 send to the serving gNB 110-1 a message containing a measured TOA for the serving gNB 110-1 and one or a few RSTDs (and uncertainties) for other gNBs 110 and that this message or some separate uplink transmission is sent by the UE 105 to enable a TOA measurement at the serving gNB 110-1. Therefore, the methods could be used by the network to track a UE 105 by arranging for the UE 105 to obtain the TOA and RSTD measurements periodically (e.g., whenever the UE 105 needs to interact with the network for some mobility management procedure like registration, re-registration, tracking area updating or to instigate data or short message service (SMS) transfer). The method can be used by the NG-RAN 135 and does not (necessarily) require a location server (e.g. the LMF 120) in the 5GC 140.

For completely asynchronous networks, measurements of TOAs and RSTDs by a UE 105 could be based on CRS or TRS signals from gNBs 110 which could interfere less than asynchronous PRS signals. However, gNBs 110 could use the measured RTDs (e.g. obtained as described for FIG. 3) to improve the level of synchronization. For example, a gNB 110 that powers on or is manually reset could first listen to neighbor gNBs 110 in order to set an initial transmission timing for which the RTD with one or more neighbor gNBs 110 is close to zero. GNBs 110 that were synchronized in this manner could then broadcast PRS.

Additionally or alternatively, to overcome multipath for RTD determination in the manner described herein, gNBs 110 could exchange RTDs or send measured RTDs to a location server (e.g. LMF 120). For any pair of gNBs 110, labelled A and B here for convenience, an RTD for gNB B obtained by gNB A as (gNB A time—gNB B time) will generally be equal and opposite in arithmetic sign to an RTD for gNB A obtained by gNB B as (gNB B time—gNB A time) when both RTDs are accurate and when the gNB A time and gNB B time for each RTD refer to the same pair of downlink signals (which may require an adjustment to one RTD). Accurate RTDs that are equal and opposite in arithmetic sign may normally be possible when downlink transmission from gNB A to gNB B and downlink transmission from gNB B to gNB A are both line of sight (LOS). Conversely, the two RTDs will not generally be equal and opposite in sign when one transmission is LOS and the other is transmission non-LOS (NLOS) due to multipath and will typically not be exactly equal and opposite when both RTDs are NLOS. In scenarios where the two RTDs are not equal and opposite in sign, the RTD with the lower absolute value would normally contain a smaller (or zero) multipath error and could thus be used as the RTD by both gNBs A and B.

The presence of multipath in RTD measurements may also be inferred and eliminated when more than two gNBs 110 measure RTD. For example, if N gNBs 110-1, 110-2, . . . 110-N each measure one RTD with gNB 110-1 measuring an RTD for gNB 110-2, gNB 110-2 measuring an RTD for gNB 110-3 etc. and gNB 110-N measuring an RTD for gNB 110-1, then when N exceeds 2, it is no longer possible to compare two RTDs obtained by one pair of gNBs 110 as in the previous example for the gNBs A and B. However, instead, the N signed RTD values (obtained by gNBs 110-1 to 110-N) may be summed. If the resulting sum is zero or close to zero, it may be assumed that the N RTD values contain little or no multipath error. However, if the sum is non-zero, the presence of a multipath error in at least one RTD measurement may be implied. The RTD measurement(s) containing the multipath error may then be determined by obtaining an RTD sum for other sets of gNBs 110 (e.g. including cases where N=2) and identifying a first set of RTD values that typically or always appear in association with a non-zero RTD sum versus a second set of RTD values that at least sometimes appear in association with a zero RTD sum. The RTD values in the first set may be assumed to contain multipath whereas the RTD values in the second set may be assumed to be for LOS transmissions. The accuracy of the RTD values in the second set may then be improved by averaging—e.g. such as using the average of the absolute values for the two RTD values for the previous example of two gNBs 110 A and B when these two RTD values are approximately equal and opposite in sign. RTD values to replace RTD values in the first set in this example, or to provide an RTD where no RTD measurement was obtained, may then be obtained in some cases by applying the RTD zero summation requirement to N gNBs 110 as in the previous example where N−1 of the N RTDs are known and where one RTD is not known (or known to contain a multipath error). The single unknown RTD may then be obtained from an RTD value that, when combined with the N−1 other known RTDs, will achieve the zero summation. The improvement of the RTDs as described here may be performed at a location server (e.g. LMF 120) if gNBs 110 send RTD values to the location server or may be performed by one or more gNBs 110—e.g. if gNBs 110 exchange measured RTD values.

FIG. 5 shows a signaling flow 500 illustrating a process in which a gNB 110 can determine an RTD to one or more other nearby gNBs 110. In the example signaling flow 500, the gNB 110-1 determines an RTD to each of gNBs 110-2 and 110-3. The gNB 110-1 and optionally the gNBs 110-2 and 110-3 may use the method described in association with FIG. 3 to perform measurements and obtain RTD values, or assist RTD determination, during the signaling flow 500. As with other figures herein, it will be understood that alternative embodiments may vary from the functions as illustrated, including adding, omitting, combining, separating, performing functions simultaneously, and otherwise varying the functions as illustrated. Dashed lines illustrate optional stages. A person of ordinary skill in the art will appreciate many additional variations.

As illustrated, the process may begin at stage 505 where the second gNB 110-2 broadcasts a reference signal (e.g., CRS, PRS, or TRS), which is received by the serving gNB 110-1. Broadcast of the reference signal at stage 505 may be continuous, periodic and/or on demand in some embodiments. At stage 510, gNB 110-1 measures a TOA for the received reference signal—e.g. measures a value for Rx3−Tx4 for the example in FIG. 3. In order to acquire and measure the reference signal at stage 510, gNB 110-1 may make use of known signal characteristics and parameters for the reference signal which may be broadcast by gNB 110-2 or may be known in advance by gNB 110-1 (e.g. may be configured by Operations and Maintenance (O&M)). Examples of such signal characteristics and parameters may include a signal carrier frequency, a bandwidth, a code sequence, a muting pattern, a frequency shift, an indication of particular subframes or radio frames carrying a reference signal etc.

In the case where a distance (e.g., distance D2 in FIG. 1) between gNB 110-1 and gNB 110-2 is not known, the optional functionality illustrated in block 515 may be performed to obtain an RTT measurement. Here, at stage 520, gNB 110-1 broadcasts a reference signal (e.g. a CRS, TRS or PRS), which is received by gNB 110-2, which measures the TOA at stage 525 (e.g. where the TOA may correspond to rx1−tx1 or rx2−tx1 in FIG. 2 in the variant of FIG. 2 described previously for obtaining an RTT between two gNBs 110). Similar to the TOA measurement described previously for stage 510, the TOA measurement by gNB 110-2 at stage 525 may be assisted by knowledge by gNB 110-2 of signal characteristics and parameters for the reference signal broadcast at stage 520, similar to those described for stage 510.

The gNB 110-2 then provides the TOA measurement obtained at stage 525 to gNB 110-1 at stage 530 (e.g. using a wired connection between gNB 110-1 and gNB 110-2, which may be direct or may contain one or more intermediate gNBs 110 and/or other elements). The gNB 110-1 then determines the RTT between gNBs 110-1 and 110-2 at stage 535 using the TOA measurement received at stage 530 and a TOA measurement obtained by gNB 110-1 for gNB 110-2 which may be the TOA measurement obtained at stage 510—e.g. as described in association with FIG. 2 previously. As part of stage 535, the gNB 110-1 may also determine the distance D2 from the determined RTT.

At stage 540, gNB 110-1 determines the RTD between gNB 110-1 and gNB 110-2 from the TOA measured at stage 510 and the known distance D2 between gNB 110-1 and gNB 110-2. This determination may be performed as described for FIG. 3. It is noted that when block 515 is performed to obtain an RTT measurement, the term (D2/c) in equation (4) for FIG. 3 can be replaced by RTT/2, where RTT is the RTT measurement obtained at stage 535.

Optionally, gNB 110-1 may also or instead determine the RTD between gNB 110-1 and another gNB 110-3 through a similar process to stages 505 to 540. Thus, at stage 545, gNB 110-3 broadcasts a reference signal (e.g. a CRS, TRS or PRS) for which the serving gNB 110-1 measures a TOA at stage 550. If the distance between gNB 110-1 and gNB 110-3 is not known, the functions in block 555 may be performed, in which case gNB 110-1 broadcasts a reference signal (e.g. a CRS, TRS or PRS) at stage 560, which is received by gNB 110-3. GNB 110-3 then measures a TOA for this reference signal at stage 565 and sends the TOA measurement to gNB 110-1 at stage 570 (e.g. using a direct or indirect wired connection between gNB 110-1 and gNB 110-3). Using this TOA measurement and another TOA measurement obtained by gNB 110-1 for gNB 110-3 (e.g. the TOA measurement obtained at stage 550), gNB 110-1 determines the RTT between gNB 110-1 and gNB 110-3 at stage 575 (e.g. as described previously in association with FIG. 2). As part of stage 575, gNB 110-1 may also determine the distance between gNB 110-1 and the third gNB 110-3 from the RTT determined at stage 575. Using the known distance between gNB 110-1 and gNB 110-3 and the TOA measurement obtained at stage 550, gNB 110-1 obtains the RTD between gNB 110-1 and gNB 110-3 at stage 580 (e.g. using the method described for FIG. 3). As for block 515, when block 555 is performed to obtain an RTT measurement, the term (D2/c) in equation (4) for FIG. 3 can be replaced by RTT/2, where RTT is the RTT measurement obtained at stage 575.

Optionally at stage 585, gNB 110-1 may provide the RTD determined at stage 540 and/or the RTD determined at stage 580 to UE 105—e.g. via broadcast or via point to point transfer and possibly according to a Radio Resource Control (RRC) protocol. GNB 110-1 may also provide other information to UE 105 at stage 585 such as the known or calculated distances between gNB 110-1 and gNB 110-2 and/or between gNB 110-1 and gNB 110-3, and/or the known locations of gNBs 110-1, 110-2 and/or 110-3. UE 105 may use the RTD(s) received at stage 585, and possibly other information received at stage 585, to help determine a location for UE 105—e.g. as described later in association with FIG. 7.

FIG. 6 shows a signaling flow 600 illustrating a process in which a location-capable device 601 may initiate the determination of the location of the UE 105, according to an embodiment. Again, a person of ordinary skill in the art will appreciate that the functionality illustrated in FIG. 6 may be altered in any of a variety of ways. For example, in some embodiments, the functionality may be altered such that the UE 105 ultimately determines its location.

The location-capable device 601 may comprise a location server (e.g., an E-SMLC, SLP, LMF 120 or a location server in NG-RAN 135), a gNB 110 (which may be gNB 110-1 or a gNB 110 different to gNB 110-1) or some other entity (e.g. an entity in NG-RAN 135 or 5GC 140). Here, the location-capable device 601 can (optionally) initiate the process by sending a location request for UE 105 to the serving gNB 110-1 for UE 105 at stage 605. In embodiments where gNB 110-1 is the location-capable device, stage 605 may be omitted. Following stage 605 (if stage 605 occurs), gNB 110-1 may obtain location related measurements to enable the location of UE 105 to be obtained according to the methods described in association with FIGS. 2-4 as described in more detail below.

At stage 610, gNB 110-1 receives an uplink signal from UE 105. The uplink signal may be received at stage 610 as part of some other procedure (e.g. a mobility management procedure performed in part by UE 105 and gNB 110-1) or may be sent by UE 105 to trigger or request a determination of the location of UE 105. Alternatively, gNB 110-1 may send a request or signal to UE 105 (e.g. an RRC request) that requests or allows UE 105 to send the uplink signal at stage 610; this request may be combined with the request described later for stage 650 or may be separate (and not shown in FIG. 6). In some cases, the uplink signal sent at stage 610 may correspond to one of the uplink messages sent by UE 105 that are described later herein such as the message sent as stage 640 or the message sent at stage 675. The uplink signal sent at stage 610 may comprise one or more uplink subframes or radio frames defined for a physical layer (e.g. 5G NR) and may optionally also comprise a message such as an RRC message.

At stage 615, gNB 110-1 measures a TOA for the uplink signal received at stage 610. For example, the TOA may correspond to the measurement Rx1–Tx1 or the measurement Tx2–Rx1 described for FIG. 2.

If gNB 110-1 does not know or cannot estimate the TOA that would be measured by UE 105 for stage 635 (e.g. by equating the TOA to a timing advance sent previously to UE 105 by gNB 110-1), the optional block 620 may be performed. As part of block 620, gNB 110-1 sends a request (e.g. an RRC request) for a TOA measurement at stage 625 to the UE 105, and broadcasts a reference signal (e.g. a CRS, TRS or PRS) at stage 630. The broadcast at stage 630 may be continuous, periodic or on demand and may or may not be specifically related to (e.g. specifically caused by) the request at stage 625. In some embodiments, the broadcast at stage 630 may be replaced by a point to point message (e.g. an RRC message). In some embodiments, the TOA request sent at stage 625 may be included in the reference signal broadcast at stage 630 or in a point to point message sent instead at stage 630. For example, a broadcast CRS, TRS or PRS signal sent at stage 630 could include an identifier for UE 105 (and optionally identifiers for other UEs) whose presence indicates to UE 105 that a TOA measurement (and possibly other measurements such as the RSTD measurements obtained at stage 670) is requested by gNB 110-1. The identifier for UE 105 may be a local identifier for UE 105 assigned by gNB 110-1 or by 5GC 140 (e.g. by AMF 115) or may be a global identifier (e.g. a Subscription Permanent Identifier (SUPI) or a Permanent Equipment Identifier (PEI)).

At stage 635, the UE 105 measures a TOA for the reference signal broadcast at stage 630 (or for a point to point message sent by gNB 110-1 at stage 630). As an example, the TOA measurement may correspond to the measurement of rx1–tx1 or the measurement of rx2–tx1 described in association with FIG. 2. To assist UE 105 in acquiring the signal broadcast (or sent point to point) at stage 630 and obtaining the TOA measurement at stage 635, the request at stage 625 may further provide information for the signal to be measured such as signal characteristics and parameters for the signal—e.g. which may include one or more of a carrier frequency, a bandwidth, a code sequence, a muting pattern, a frequency shift, an indication of particular subframes or radio frames carrying a reference signal etc. Alternatively, in some embodiments, gNB 110-1 may broadcast some or all of this information to UE 105 and other UEs (not shown in FIG. 6). UE 105 then sends the TOA measurement obtained at stage 635 to gNB 110-1 at stage 640 (e.g. in an RRC message).

Based on the TOA measurement obtained at stage 615 and the TOA measurement obtained at stage 640 if stage 640 occurs (or based on prior knowledge or estimation of a TOA measurement for stage 635 as described previously), gNB 110-1 may determine the RTT between gNB 110-1 and UE 105 at stage 645 and may further determine a distance D1 between gNB 110-1 and UE 105 based on the RTT. For example, the determination at stage 645 may be as described for FIG. 2. In an embodiment, stage 645 is not performed or only partially performed (e.g. to determine the RTT but not the distance D1). In this embodiment, some or all of the determination at stage 645 is performed by a different entity such as the location-capable device 601—e.g. following stage 685 (not shown in FIG. 6).

To initiate the RSTD measurements, gNB 110-1 sends a request for RSTD measurements to UE 105 at stage 650. For example, this request may be included in an RRC message or may be part of a physical layer signal (e.g. a CRS, TRS or PRS) broadcast by gNB 110-1—e.g. as described previously by including an identifier for UE 105 within the physical layer signal. The request sent at stage 650 may indicate the cells or gNBs 110 for which RSTD measurements are requested. For example, the request may indicate gNBs 110-1, 110-2 and optionally 110-3 (and possibly other gNBs 110 not shown in FIG. 6) or may indicate a cell or more than one cell for each of these gNBs 110 (and optionally for other gNBs 110). The request may further provide additional information for the reference signals to be measured later at stage 670 such as signal characteristics and parameters for a reference signal—e.g. which may include one or more of a carrier frequency, a bandwidth, a code sequence, a muting pattern, a frequency shift, an indication of particular subframes or radio frames carrying a reference signal etc. Alternatively, some or all of this additional information may be provided to UE 105 (and to other UEs) via broadcast by gNB 110-1 (not shown in FIG. 6). The additional information may assist UE 105 to acquire and measure the reference signals later at stage 670.

At stages 655, 660 and optionally 665, gNBs 110-1, 110-2 and 110-3, respectively, each broadcast a reference signal (e.g. a CRS, TRS or PRS) which is received by UE 105. The broadcast by each of gNBs 110-1, 110-2 and 110-3 may be continuous, periodic or on demand and may or may not be specifically related to (e.g. specifically caused by) the request at stage 650. The UE 105 then measures RSTDs between one or more pairs of gNBs 110 at stage 670—e.g. as requested at stage 650. For example, UE 105 may measure an RSTD between gNB 110-1 and gNB 110-2 which may correspond to the RSTD measurement (rx4−rx3) described previously in association with FIG. 4. UE 105 may also measure an RSTD between gNBs 110-1 and 110-3 and RSTDs between other pairs of gNBs 110. In some embodiments, each of the RSTDs measured at stage 670 is between the serving gNB 110-1 and another gNB 110 (e.g. gNB 110-2 or gNB 110-3). UE 105 then returns the RSTDs measured at stage 670 to the serving gNB 110-1 at stage 675—e.g. in an RRC message.

Following stage 675 and stage 645 and based on the nature of the location request at stage 605 (if stage 605 occurs) and/or other factors, the serving gNB 110-1 may optionally determine the location of the UE 105 at stage 680. The location determination at stage 680 may be based on the RSTD measurements received at stage 675, an RTT (and distance D1) determined at stage 645 and one or more RTDs obtained as described for signaling flow 500. For example, the location determination may be as described for FIG. 4—e.g. based on equations (5) to (9). The location determination may thus include determining a distance D1 between the UE 105 and gNB 110-1 as part of RTT determination at stage 645 and a distance D3 between the UE 105 and gNB 110-2—e.g. as described for equation (9). Distances to other gNBs 110 (e.g. gNB 110-3) may also be determined at stage 680 and the location of UE 105 may be obtained from the intersection of circles with radii equal to the distances D1, D3 etc. as previously described (e.g. in association with FIG. 4).

GNB 110-1 may then send a location response to the location-capable device 601 at stage 685. The location response at stage 685 may be sent when the location request at stage 605 was received and may include a location for UE 105 determined at stage 680. In an aspect, when stage 680 does not occur, the location response sent at stage 685 may include some or all of the measurements obtained or received by gNB 110-1 such as the RSTD measurements received at stage 675, the TOA measurement received at stage 640 (or a TOA measurement already known or estimated by gNB 110-1), the TOA measurement obtained at stage 615, the RTT or distance D1 determined at stage 645, and/or any RTD values determined according to FIG. 5. In this aspect, the location-capable device 601 may determine the location of UE 105, at least in part, using the measurements provided at stage 685. In an aspect, the location request sent at stage 605 and the location response sent at stage 685 (when stage 605 and stage 685 both occur) may each comprise a message for LPPa or a message for NRPPa.

FIG. 7 shows a signaling flow 700 illustrating a process in which the UE 105 determines the location of UE 105 rather than some network entity as in FIG. 6. Again, a person of ordinary skill in the art will appreciate that the functionality illustrated in FIG. 7 may be altered in any of a variety of ways. For example, in some embodiments, the functionality may be altered such that a gNB 110, location-capable device 601, or other device ultimately determines a location of the UE.

Similar to the process illustrated in FIG. 6, signaling flow 700 may (optionally) begin when a location-capable device 601 sends a location request to UE 105 at stage 705. As for signaling flow 600, the location-capable device 601 may comprise a location server (e.g., an E-SMLC, SLP, LMF 120 or a location server in NG-RAN 135) or may be a gNB 110 (e.g. the serving gNB 110-1) or some other entity (e.g. an entity in NG-RAN 135 or 5GC 140). The location-capable device 601 can also (optionally) send additional information to UE 105 in the form of assistance data at stage 710 in one or more messages to assist UE 105 in determining the location of the UE 105 and/or in measuring TOAs and RSTDs. The assistance data sent at stage 710 may include signal characteristics and parameters for reference signals received by UE 105 from one or more gNBs 110 and measured later in the process at stages 725 and 775 as described later. For example, the assistance data may assist UE 105 to acquire and measure the reference signals broadcast by gNBs 110 at stages 720 and 760-770 as described later and, for each reference signal, may include one or more of a carrier frequency, a bandwidth, a code sequence, a muting pattern, a frequency shift, an indication of particular subframes or radio frames carrying a reference signal. The assistance data sent at stage 710 may also or instead include the locations of the antennas for gNBs 110 and RTDs between pairs of gNBs 110 (e.g. such as obtained as described for FIG. 5). In different embodiments, stage 710 may occur before, after or at the same time as stage 705 or may be combined with stage 705. In an aspect, the information for stage 705 and stage 710 may be sent as one or more NPP or LPP messages.

In an aspect, some or all of the assistance data described for stage 710 may be optionally broadcast at stage 715 by serving gNB 110-1 to UE 105 and to other UEs. In this aspect, stage 710 may not occur.

At stage 720, the serving gNB 110-1 broadcasts a reference signal (e.g. a CRS, TRS or PRS) which is received by the UE 105. The broadcast at stage 720 may be continuous, periodic or on demand. At stage 725, the UE 105 measures a TOA for the reference signal broadcast at stage 720. As an example, the TOA measurement may correspond to the measurement of rx1−tx1 or the measurement of rx2−tx1 described in association with FIG. 2.

If UE 105 already knows, at least approximately, a TOA that would be measured by gNB 110-1 as described later for stage 745, UE 105 may determine an RTT between gNB 110-1 and UE 105 at stage 755 (e.g. as described for FIG. 2) without instigating stages 735-750 for optional block 730. For example, if gNB 110-1 provides a timing advance to UE 105 (not shown in FIG. 7) to synchronize the arrival of uplink subframes or radio frames transmitted from UE 105 to gNB 110-1 with downlink subframe or radio frame transmission transmitted at gNB 110-1, UE 105 may assume that the TOA that would be measured by gNB 110-1 at stage 745 will be approximately zero.

If UE 105 does not know or cannot estimate the TOA for stage 745, the optional block 730 may be performed. As part of block 730, UE 105 sends a request for a TOA measurement at stage 735 to the gNB 110-1 (e.g. in an RRC message), and sends an uplink signal to gNB 110-1 or possibly a reference signal (e.g. a TRS or PRS) at stage 740. In an aspect, the uplink signal sent at stage 740 may be the same as the message of signal sequence sent at stage 735. In an aspect, following receipt of the request at stage 735, gNB 110-1 sends a request to UE 105 to send the uplink signal at stage 740 (not shown in FIG. 7). A request sent by gNB 110-1 to UE 105 to send the uplink signal at stage 740 may be sent as a message (e.g. an RRC message) or may be sent by including an identifier for UE 105 (e.g. a local or global identifier) in a downlink signal (e.g. a downlink reference signal or paging signal) broadcast by gNB 110-1 to UE 105 and other UEs.

At stage 745, gNB 110-1 measures a TOA for the uplink signal received at stage 740. For example, the TOA may correspond to the measurement Rx1–Tx1 or the measurement Tx2–Rx1 described for FIG. 2. GNB 110-1 then sends the TOA measurement to UE 105 at stage 750 (e.g. in an RRC message).

Based on the TOA measurement obtained at stage 725 and the TOA measurement obtained at stage 750 if step 750 occurs (or based on prior knowledge or estimation of a TOA measurement for stage 750 as described previously), UE 105 may determine the RTT between gNB 110-1 and UE 105 at stage 755 and may further determine a distance D1 between gNB 110-1 and UE 105 based on the RTT. For example, the determination at stage 755 may be as described for FIG. 2. In some embodiments, stage 755 is not performed or only partially performed (e.g. to determine the RTT but not the distance D1). In these embodiments, some or all of the determination at stage 755 is performed by a different entity such as the location-capable device 601—e.g. following stage 785 (not shown in FIG. 7).

At stages 760-775, as described next, UE 105 obtains RSTD measurements for pairs of gNBs 110. Stages 760-775 may be performed before stages 720-755, after stages 720-755, at the same time as stages 720-755 or may be combined with stages 720-755. As an example of combining stages 720-755 and stages 760-775, the TOA measurement at stage 725 may form part of the RSTD measurements at stage 775 and/or the reference signal broadcast by gNB 110-1 at stage 720 may be the same as the reference signal broadcast by gNB 110-1 at stage 760.

At stages 760, 765 and optionally 770, gNBs 110-1, 110-2 and 110-3, respectively, each broadcast a reference signal (e.g. a CRS, TRS or PRS) which is received by UE 105. The broadcast by each of gNBs 110-1, 110-2 and 110-3 may be continuous, periodic or on demand. The UE 105 then measures RSTDs between one or more pairs of gNBs at stage 775—e.g. as requested at stage 705 if stage 705 occurs. For example, UE 105 may measure an RSTD between gNB 110-1 and gNB 110-2 which may correspond to the RSTD measurement (rx4–rx3) described in association with FIG. 4. UE 105 may also measure an RSTD between gNBs 110-1 and 110-3 and RSTDs between other pairs of gNBs 110. In some embodiments, each of the RSTDs measured at stage 775 is between the serving gNB 110-1 and another gNB 110 (e.g. gNB 110-2 or gNB 110-3). In some other embodiments, each of the RSTDs measured at stage 775 is between a reference gNB 110 different to the serving gNB 110-1 and another gNB 110 (e.g. gNB 110-1, gNB 110-2 or gNB 110-3).

Following stage 775 and stage 755, the UE 105 may determine the location of the UE 105 at stage 780. The location determination at stage 780 may be based on the RSTD measurement(s) obtained at stage 775, an RTT (and distance D1) determined at stage 755 and one or more RTDs and gNB 110 antenna locations received as assistance data at stage 710 and/or stage 715. For example, the location determination at stage 780 may be as described for FIG. 4—e.g. based on equations (5) to (9). The location determination may thus include determining a distance D1 between the UE 105 and gNB 110-1 as part of RTT determination at stage 755 and a distance D3 between the UE 105 and gNB 110-2—e.g. as described for equations (5) to (9). Distances to other gNBs 110 (e.g. gNB 110-3) may also be determined at stage 780 and the location of UE 105 may be obtained from the intersection of circles with radii equal to the distance D1, distance D3 etc. as previously described for FIG. 4.

UE 106 may then optionally send a location response to the location-capable device 601 at stage 785 if stage 705 occurs. The location response at stage 785 may include a location for UE 105 determined at stage 780. In an aspect, if stage 780 does not occur, the location response sent at stage 785 may include some or all of the measurements obtained or received by UE 105 such as the RSTD measurement(s) obtained at stage 775, the TOA measurement received at stage 750, the TOA measurement obtained at stage 725 and/or the RTT or distance D1 determined at stage 755. In this aspect, the location-capable device 601 may determine the location of UE 105 (not shown in FIG. 7), at least in part using the measurements provided at stage 785. In an aspect, the information for stage 785 may be sent as one or more NPP or LPP messages.

Figure 8:
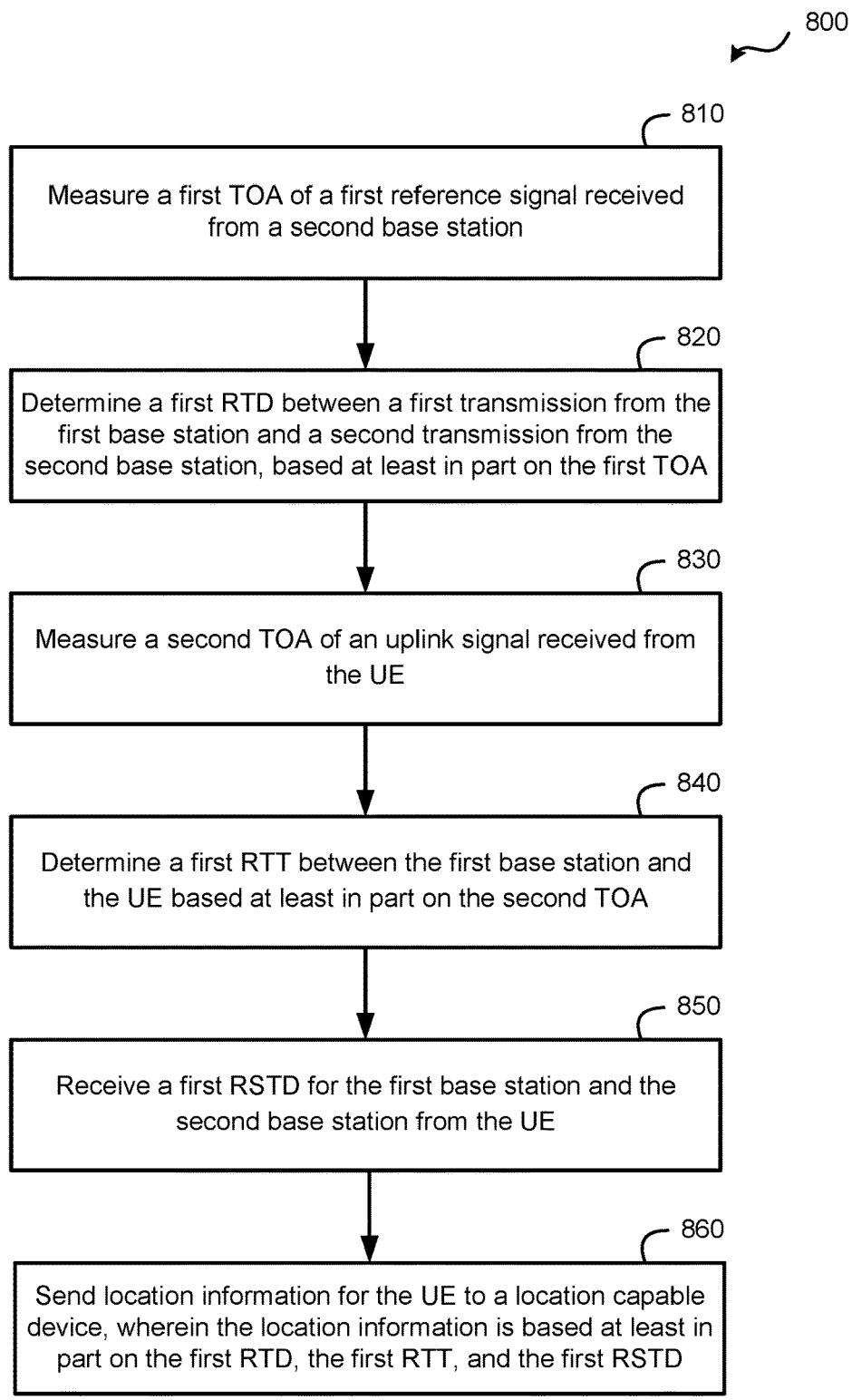
FIG. 8 is a flow diagram illustrating a method of locating a UE at a first base station, according to an embodiment.

FIG. 8 is a flow diagram illustrating a method 800 of locating a UE (e.g. UE 105) at a first base station, according to an embodiment, which illustrates the functionality of a base station according to aspects of embodiments described above and illustrated in FIGS. 1-7. According to some embodiments, the functionality of one or more blocks illustrated in FIG. 8 may be performed by the first base station (e.g., a gNB 110 such as the serving gNB 110-1 for the UE 105, an ng-eNB 114 or an eNB). And because a base station may comprise a computer system, means for performing these functions may include software and/or hardware components of a computer system, such as the computer system illustrated in FIG. 11 and described in more detail below.

At block 810, a first TOA of a first reference signal received from a second base station is measured. As described previously, the first reference signal may comprise a CRS, PRS, and/or TRS transmitted by the second base station and received at the first base station, as illustrated in FIGS. 3 and 5 above. Means for performing the functionality at block 810 may comprise one or more components of a computer system, such as a bus 1105, processing unit(s) 1110, communication subsystem 1130, working memory 1135, operating system 1140, application(s) 1145, and/or other components of the computer system 1100 illustrated in FIG. 11 and described in more detail below. Block 810 may correspond to stage 510 of signaling flow 500 in an aspect.

At block 820, the first base station determines a first RTD between a first transmission from the first base station and a second transmission from the second base station, based at least in part on the first TOA. The first RTD may be determined based on the first TOA as described for FIG. 3. In some embodiments, determining the first RTD at block 820 may further comprise determining an RTT between the first base station and the second base station (e.g. as described for FIG. 5). Means for performing the functionality at block 820 may comprise one or more components of a computer system, such as a bus 1105, processing unit(s) 1110, working memory 1135, operating system 1140, application(s) 1145, and/or other components of the computer system 1100 illustrated in FIG. 11 and described in more detail below. Block 820 may correspond to stage 540 or stage 580 of signaling flow 500 in an aspect.

At block 830, a second TOA of an uplink signal received from the UE is measured by the first base station. Block 830 may correspond to stage 615 of signaling flow 600 in an aspect.

At block 840, the first base station determines a first RTT between the first base station and the UE based at least in part on the second TOA. Additional details for determining the first RTT at block 840 are illustrated in FIG. 2 and described above (e.g. such as using the method A or the method B for FIG. 2). Means for performing the functionality at blocks 830 and/or 840 may comprise one or more components of a computer system, such as a bus 1105, processing unit(s) 1110, communication subsystem 1130, working memory 1135, operating system 1140, application(s) 1145, and/or other components of the computer system 1100 illustrated in FIG. 11 and described in more detail below. Block 840 may correspond to stage 645 of signaling flow 600 in an aspect.

At block 850, the first base station receives a first RSTD for the first base station and the second base station from the UE. For example, the UE may provide the first RSTD to the first base station when prompted by a request sent to the UE from the first base station (e.g. as at stage 650 for signaling flow 600) as described for FIG. 6. Means for performing the functionality at block 850 may comprise one or more components of a computer system, such as a bus 1105, processing unit(s) 1110, communication subsystem 1130, working memory 1135, operating system 1140, application(s) 1145, and/or other components of the computer system 1100 illustrated in FIG. 11 and described in more detail below. Block 850 may correspond to stage 675 of signaling flow 600 in an aspect.

At block 860, the first base station sends location information for the UE to a location-capable device, where the location information is based at least in part on the first RTD, the first RTT, and the first RSTD. As illustrated in FIG. 6, the location information may be provided to a location-capable device (e.g., in a location response such as at stage 685 in signaling flow 600), which may then determine the location of the UE based on the location information (e.g. using the techniques described in association with FIGS. 2, 3 and 4 and equations (1) to (9)). Additionally or alternatively, the method 800 may comprise determining the location of the UE by the first base station and based at least in part on the first RTD, the first RTT, and the first RSTD (e.g. as at stage 680 for signaling flow 600), in which case the location information may comprise the determined location of the UE. As noted above, the location-capable device may comprise an LMF (e.g. LMF 120). However, in some embodiments, the location-capable device may comprise a different device, such as a base station different from the first base station, a location server in a RAN (e.g. the NG-RAN 135), or other device.

Means for performing the functionality at block 860 may comprise one or more components of a computer system, such as a bus 1105, processing unit(s) 1110, communication subsystem 1130, working memory 1135, operating system 1140, application(s) 1145, and/or other components of the computer system 1100 illustrated in FIG. 11 and described in more detail below. Block 860 may correspond to stage 685 of signaling flow 600 in an aspect.

The method 800 may include other features, depending on desired functionality. For example, the first reference signal may be a Positioning Reference Signal (PRS), a Tracking Reference Signal (TRS), or a Cell-specific Reference Signal (CRS). In addition or instead, the method 800 may be executed by a base station in a 5G network or a network other than a 5G network. Thus, the first and second base stations may comprise evolved Node Bs (eNBs) for LTE, ng-eNBs for LTE (e.g. ng-eNB 114) or gNBs for 5G NR (e.g. gNBs 110). In some embodiments, the first base station is a serving base station for the UE. In some embodiments, the method 800 may further comprise broadcasting a second reference signal (e.g. as at stage 630 for signaling flow 600) and receiving a timing measurement from the UE for the second reference signal (e.g. as at stage 640 for signaling flow 600), where the first RTT is further determined at block 840 based at least in part on the timing measurement (e.g. as at stage 645 for signaling flow 600). In some embodiments, the second reference signal may also comprise a PRS, TRS, or CRS. The timing measurement received from the UE may comprise a TOA measurement or a measurement of a transmit time-receive time difference obtained at the UE (e.g. as at stage 635 for signaling flow 600) in an aspect.

Further, as noted above, information from other base stations may be utilized. For example, in some embodiments, the method 800 may further comprise measuring a third TOA of a third reference signal received from a third base station (e.g. as stage 550 for signaling flow 500), determining a second RTD between a third transmission from the first base station and a fourth transmission from the third base station, based at least in part on the third TOA (e.g. as at stage 580 for signaling flow 500), and receiving a second RSTD for the first base station and the third base station from the UE (e.g. as at stage 675 for signaling flow 600). Here, the location information for the UE at block 860 may be further based at least in part on the second RTD and the second RSTD. In addition, the first base station may further determine the location of the UE based at least in part on the first RTD, the first RTT, the first RSTD, the second RTD, and the second RSTD (e.g. as at stage 680 for signaling flow 600), where the location information comprises the determined location of the UE.

Figure 9:
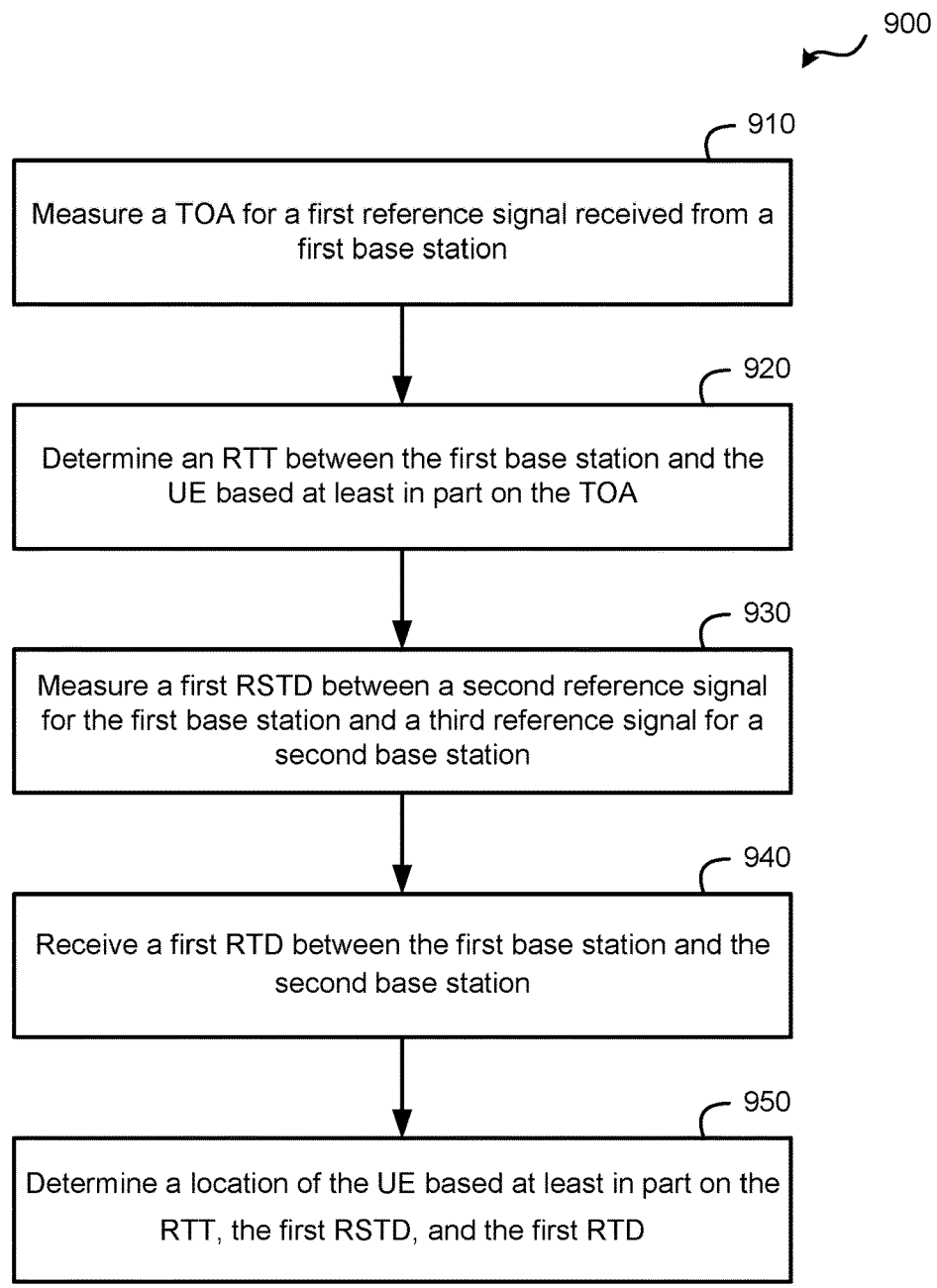
FIG. 9 is a flow diagram illustrating a method of locating a UE at the UE, according to an embodiment.

FIG. 9 is a flow diagram illustrating a method 900 of locating a UE at the UE, according to an embodiment, which illustrates the functionality of a UE according to aspects of embodiments described above and illustrated in FIGS. 1-7. According to some embodiments, functionality of one or more blocks illustrated in FIG. 9 may be performed by a UE (e.g. UE 105). Means for performing these functions may include software and/or hardware components of a UE 105, as illustrated in FIG. 10 and described in more detail below.

At block 910, the functionality includes measuring a TOA for a first reference signal received from a first base station. The first base station may be a serving base station for the UE (e.g. may correspond to gNB 110-1 in FIG. 1). Block 910 may correspond to stage 725 of signaling flow 700 in an aspect.

At block 920, the UE determines an RTT between the first base station and the UE based at least in part on the TOA. Determination of the RTT may be as described for FIG. 2 (e.g. using the method A or the method B for FIG. 2). Block 920 may correspond to stage 755 of signaling flow 700 in an aspect. Means for performing the functions at blocks 910 and/or 920 may comprise a bus 1005, processing unit(s) 1010, wireless communication interface 1030, memory

Figure 10:
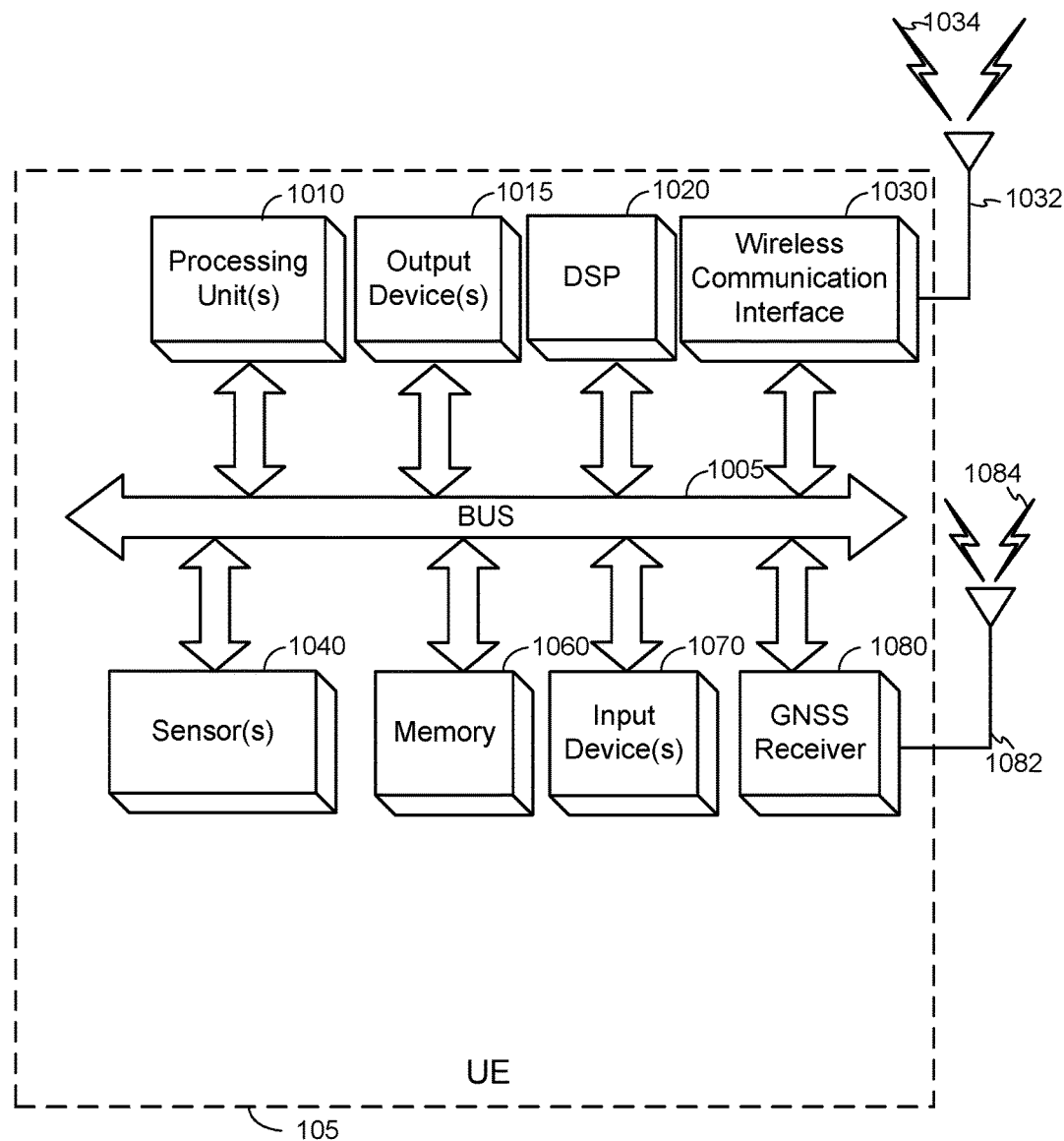
FIG. 10 is an embodiment of a UE.

1060, GNSS receiver 1080, and/or other hardware and/or software components of a UE 105 as illustrated in FIG. 10 and described in more detail below.

At block 930, a first RSTD between a second reference signal for the first base station and a third reference signal for a second base station is measured. As noted above, the second and third reference signals, along with the first reference signal, may comprise a PRS, TRS, or CRS. Further, the first and second base stations may comprise eNBs for LTE, ng-eNBs for LTE (e.g. ng-eNBs 114) or gNBs for 5G NR (e.g. gNBs 110). It can also be noted that the first RSTD and the TOA may be measured by the UE based on the same reference signal received from the first base station. Accordingly, in some scenarios, the first reference signal and the second reference signal may comprise the same reference signal. Means for performing the functions at block 930 may comprise a bus 1005, processing unit(s) 1010, wireless communication interface 1030, memory 1060, GNSS receiver 1080, and/or other hardware and/or software components of a UE 105 as illustrated in FIG. 10 and described in more detail below. Block 930 may correspond to stage 775 of signaling flow 700 in an aspect.

At block 940, a first RTD between the first base station and the second base station is received by the UE. This may be received from any of a variety of devices, as illustrated in FIG. 7. For example, in some embodiments the first RTD may be received from an LMF (e.g. LMF 120), such as at stage 710 for signaling flow 700. In some other embodiments the first RTD may be received from a base station (e.g. a gNB 110), which may be the first base station in some embodiments (e.g. as at stage 715 for signaling flow 700). Moreover, the first RTD may be received by the UE at some other point during the method 900, at a different sequence than illustrated. The first RTD may have been determined (e.g. by the first base station or by an LMF such as LMF 120) as described in association with FIG. 3. Means for performing the functions at block 940 may comprise a bus 1005, processing unit(s) 1010, wireless communication interface 1030, memory 1060, GNSS receiver 1080, and/or other hardware and/or software components of a UE 105 as illustrated in FIG. 10 and described in more detail below.

At block 950, the UE determines a location of the UE based at least in part on the RTT, the first RSTD, and the first RTD. The location determination at block 950 may be according to the techniques described previously in association with FIG. 4 and equations (5) to (9). Means for performing the functions at block 950 may comprise a bus 1005, processing unit(s) 1010, memory 1060, and/or other hardware and/or software components of a UE 105 as illustrated in FIG. 10 and described in more detail below. Block 950 may correspond to stage 780 of signaling flow 700 in an aspect.

The method 900 may include additional or alternative functions, depending on desired functionality. In some embodiments, for example, the method 900 may include sending an uplink signal to the first base station (e.g. as at stage 740 for signaling flow 700) and receiving a timing measurement for the uplink signal from the first base station (e.g. as at stage 750 for signaling flow 700), where the RTT is further determined at block 920 based at least in part on the timing measurement. In some embodiments, the timing measurement may comprise a TOA measurement or a measurement of a transmit time-receive time difference obtained at the first base station.

A third base station (e.g. a gNB 110-3) may also be utilized in some embodiments, as illustrated above. For example, the method 900 may further comprise measuring a second RSTD between a fourth reference signal for the first base station and a fifth reference signal for a third base station (e.g. as at stage 775 for signaling flow 700), and receiving a second RTD between the first base station and the third base station (e.g. at stage 710 or stage 715 for signaling flow 700). In these embodiments, determining the location of the UE at block 950 may be further based at least in part on the second RSTD and the second RTD (e.g. as described for FIG. 4 and for stage 780 for signaling flow 700). Here, the second reference signal and the fourth reference signal, in some aspects, may be the same reference signal (e.g. when the UE measures the first RSTD and second RSTD using the same reference signal for the first base station).

FIG. 10 illustrates an embodiment of a UE 105, which can be utilized as described herein above (e.g. in association with FIGS. 1-9). For example, the UE 105 can perform one or more of the functions of method 900 of FIG. 9. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 10, some embodiments may have a separate Digital Signal Processor (DSP) 1020, depending on desired functionality. Location determination and/or other determinations based on wireless communication may be provided in the processing unit(s) 1010 and/or wireless communication interface 1030 (discussed below). The UE 105 also can include one or more input devices 1070, which can include without limitation a keyboard, touch screen, a touch pad, microphone, button(s), dial(s), switch(es), and/or the like; and one or more output devices 1015, which can include without limitation a display, light emitting diode (LED), speakers, and/or the like.

The UE 105 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, cellular communication facilities, etc.), and/or the like, which may enable the UE 105 to communicate via the networks described above with regard to FIG. 1. The wireless communication interface 1030 may permit data and signaling to be communicated (e.g. transmitted and received) with a network, eNBs, gNBs, ng-eNBs, and/or other network components, computer systems, and/or any other electronic devices described herein. The communication can be carried out via one or more wireless communication antenna(s) 1032 that send and/or receive wireless signals 1034.

Depending on desired functionality, the wireless communication interface 1030 may comprise separate transceivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as cdma2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein.

Embodiments of the UE 105 may also include a GNSS receiver 1080 capable of receiving signals 1084 from one or more GNSS satellites (e.g., SVs 190) using an antenna 1082 (which could be the same as antenna 1032). Positioning based on GNSS signal measurement can be utilized to complement and/or incorporate the techniques described herein. The GNSS receiver 1080 can extract a position of the UE 105, using conventional techniques, from GNSS SVs of a GNSS system, such as Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The UE 105 may further include and/or be in communication with a memory 1060. The memory 1060 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1060 of the UE 105 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 105 (and/or processing unit(s) 1010 or DSP 1020 within UE 105). In an aspect, then, such code and/or instructions can be used to configure and/or adapt a general purpose computer (or other device) to perform one or more operations in accordance with the described methods.

Figure 11:
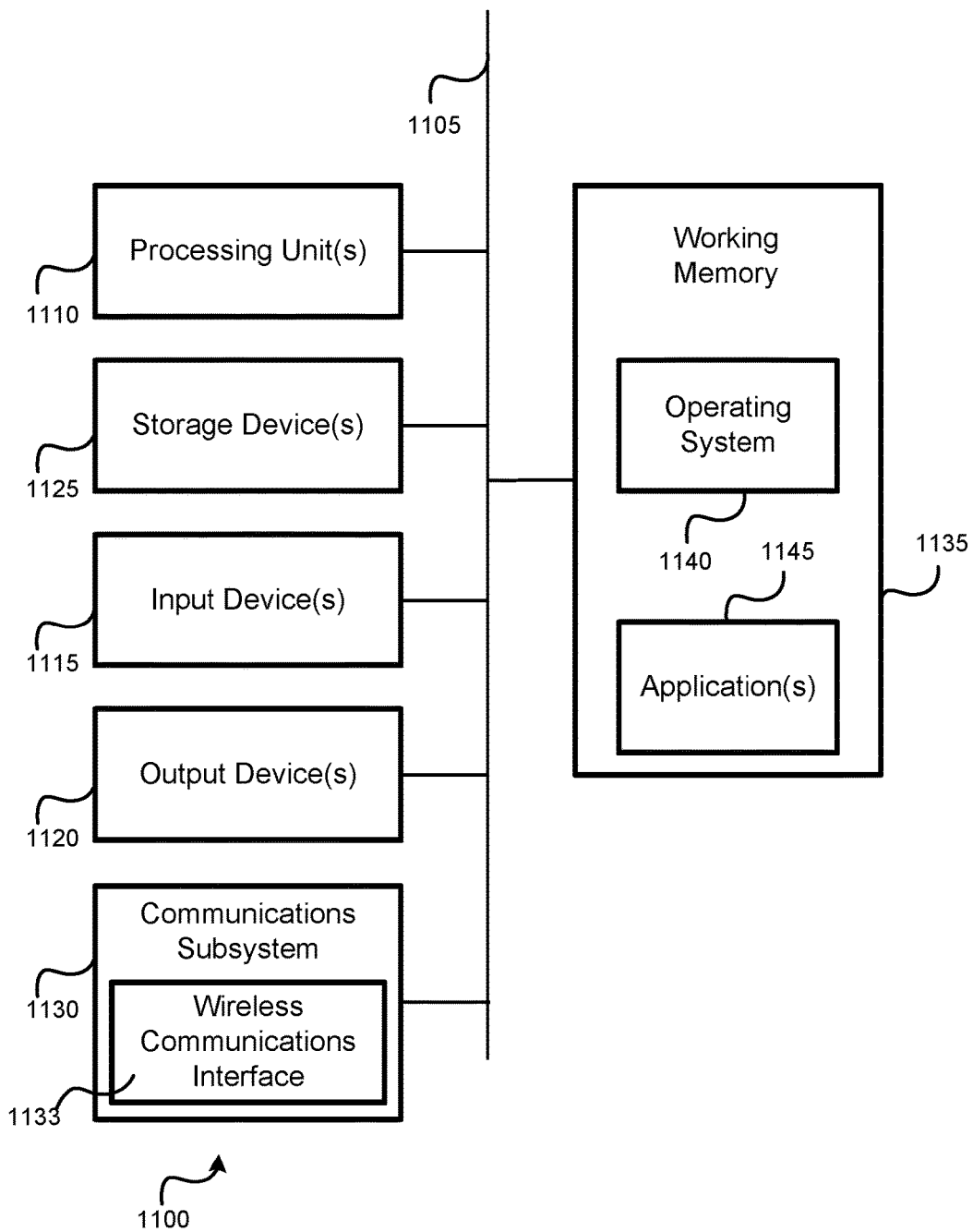
FIG. 11 is an embodiment of a computer system.

FIG. 11 illustrates an embodiment of a computer system 1100, which may be utilized and/or incorporated into one or more components of a communication system (e.g., communication system 100 of FIG. 1), including various components of a 5G network, such as the NG-RAN 135 and 5GC 140, and/or similar components of other network types. FIG. 11 provides a schematic illustration of one embodiment of a computer system 1100 that can perform the methods provided by various other embodiments, such as the method described in relation to FIG. 8. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different physical or geographical locations. In some embodiments, the computer system 1100 may correspond to an LMF 120, a gNB 110 (e.g. gNB 110-1), an ng-eNB 114, an eNB, an E-SMLC, a SUPL SLP and/or some other type of location-capable device.

The computer system 1100 is shown comprising hardware elements that can be electrically coupled via a bus 1105 (or may otherwise be in communication, as appropriate). The hardware elements may include processing unit(s) 1110, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 8. The computer system 1100 also can include one or more input devices 1115, which can include without limitation a mouse, a keyboard, a camera, a microphone, and/or the like; and one or more output devices 1120, which can include without limitation a display device, a printer, and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1100 may also include a communications subsystem 1130, which can include support of wireline communication technologies and/or wireless communication technologies (in some embodiments) managed and controlled by a wireless communication interface 1133. The communications subsystem 1130 may include a modem, a network card (wireless or wired), an infrared communication device, a wireless communication device, and/or a chipset, and/or the like. The communications subsystem 1130 may include one or more input and/or output communication interfaces, such as the wireless communication interface 1133, to permit data and signaling to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 1100 will further comprise a working memory 1135, which can include a RAM and/or or ROM device. Software elements, shown as being located within the working memory 1135, can include an operating system 1140, device drivers, executable libraries, and/or other code, such as application(s) 1145, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 8, may be implemented as code and/or instructions that are stored (e.g. temporarily) in working memory 1135 and are executable by a computer (and/or a processing unit within a computer such as processing unit(s) 1110); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of locating a User Equipment (UE) at a first base station, the method comprising:
   measuring a first time of arrival (TOA) of a first reference signal received from a second base station;
   determining a first Real Time Difference (RTD) between a first transmission from the first base station and a second transmission from the second base station, based at least in part on the first TOA, wherein determining the first RTD further comprises determining a first Round Trip signal propagation Time (RTT) between the first base station and the second base station;
   measuring a second TOA of an uplink signal received from the UE;
   determining a second RTT between the first base station and the UE based at least in part on the second TOA;
   receiving a first Reference Signal Time Difference (RSTD) for the first base station and the second base station from the UE; and
   sending location information for the UE to a location-capable device, wherein the location information is based at least in part on the first RTD, the second RTT, and the first RSTD.

2. The method of claim 1, further comprising determining a location of the UE based at least in part on the first RTD, the second RTT, and the first RSTD, wherein the location information comprises the determined location of the UE.

3. The method of claim 1, wherein the location-capable device determines a location of the UE based at least in part on the location information.

4. The method of claim 1, wherein the location-capable device comprises a Location Management Function (LMF), a base station different from the first base station, or a location server in a radio access network.

5. The method of claim 1, wherein the first reference signal comprises a Positioning Reference Signal (PRS), a Tracking Reference Signal (TRS), or a Cell-specific Reference Signal (CRS).

6. The method of claim 1, wherein the first and second base stations comprise evolved Node Bs (eNBs) for Long Term Evolution (LTE), next generation eNBs (ng-eNBs) for LTE or New Radio (NR) Node Bs (gNBs) for Fifth Generation (5G) NR.

7. The method of claim 1, wherein the first base station comprises a serving base station for the UE.

8. The method of claim 1 and further comprising:
   broadcasting a second reference signal; and
   receiving a timing measurement from the UE for the second reference signal, wherein the second RTT is further determined based at least in part on the timing measurement.

9. The method of claim 8, wherein the second reference signal comprises a Positioning Reference Signal, a Tracking Reference Signal or a Cell-specific Reference Signal.

10. The method of claim 8, wherein the timing measurement comprises a TOA measurement or a measurement of a transmit time-receive time difference at the UE.

11. The method of claim 1 and further comprising:
    measuring a third time of arrival (TOA) of a third reference signal received from a third base station;
    determining a second RTD between a third transmission from the first base station and a fourth transmission from the third base station, based at least in part on the third TOA; and
    receiving a second RSTD for the first base station and the third base station from the UE, wherein the location information for the UE is further based at least in part on the second RTD and the second RSTD.

12. The method of claim 11, further comprising determining a location of the UE based at least in part on the first RTD, the second RTT, the first RSTD, the second RTD, and the second RSTD, wherein the location information comprises the determined location of the UE.

13. A method of locating a User Equipment (UE) at the UE, the method comprising:
    measuring a time of arrival (TOA) for a first reference signal received from a first base station;
    determining a first Round Trip signal propagation Time (RTT) between the first base station and the UE based at least in part on the TOA;
    measuring a first Reference Signal Time Difference (RSTD) between a second reference signal for the first base station and a third reference signal for a second base station;
    receiving a first real time difference (RTD) between the first base station and the second base station, based on a second RTT between the first base station and the second base station; and
    determining a location of the UE, based at least in part on the first RTT, the first RSTD, and the first RTD.

14. The method of claim 13, wherein the first RTD is received from the first base station or from a Location Management Function (LMF).

15. The method of claim 13, wherein each of the first reference signal, the second reference signal and the third reference signal comprises a Positioning Reference Signal, a Tracking Reference Signal, or a Cell-specific Reference Signal.

16. The method of claim 13, wherein the first reference signal and the second reference signal comprise the same reference signal.

17. The method of claim 13, wherein the first base station and the second base station comprise evolved Node Bs (eNBs) for Long Term Evolution (LTE), next generation eNBs (ng-eNBs) for LTE or New Radio (NR) Node Bs (gNBs) for Fifth Generation (5G) NR.

18. The method of claim 13, wherein the first base station comprises a serving base station for the UE.

19. The method of claim 13 and further comprising:
    sending an uplink signal to the first base station; and
    receiving a timing measurement for the uplink signal from the first base station, wherein the first RTT is further determined based at least in part on the timing measurement.

20. The method of claim 19, wherein the timing measurement comprises a TOA measurement or a measurement of a transmit time-receive time difference obtained at the first base station.

21. The method of claim 13 and further comprising:
measuring a second RSTD between a fourth reference signal for the first base station and a fifth reference signal for a third base station; and
receiving a second RTD between the first base station and the third base station, wherein determining the location of the UE is further based at least in part on the second RSTD and the second RTD.

22. The method of claim 21, wherein the second reference signal and the fourth reference signal are the same reference signal.

23. A base station comprising:
a wireless communication interface;
a memory; and
a processing unit communicatively coupled with the wireless communication interface and the memory and configured to:
measure, with the wireless communication interface, a first time of arrival (TOA) of a first reference signal received from a second base station;
determine a first Real Time Difference (RTD) between a first transmission from the base station and a second transmission from the second base station, based at least in part on the first TOA, wherein determining the first RTD further comprises determining a first Round Trip signal propagation Time (RTT) between the first base station and the second base station;
measure, with the wireless communication interface, a second TOA of an uplink signal received from a User Equipment (UE);
determine a second RTT between the base station and the UE based at least in part on the second TOA;
receive, with the wireless communication interface, a first Reference Signal Time Difference (RSTD) for the base station and the second base station from the UE; and
send, with the wireless communication interface, location information for the UE to a location-capable device, wherein the location information is based at least in part on the first RTD, the second RTT, and the first RSTD.

24. The base station of claim 23, wherein the processing unit is further configured to determine a location of the UE based at least in part on the first RTD, the second RTT, and the first RSTD, wherein the location information comprises the determined location of the UE.

25. The base station of claim 23, wherein the base station comprises an evolved Node B (eNB) for Long Term Evolution (LTE), a next generation eNB (ng-eNB) for LTE or a New Radio (NR) Node B (gNB) for Fifth Generation (5G) NR.

26. The base station of claim 23, wherein the base station comprises a serving base station for the UE.

27. A User Equipment (UE) comprising:
a wireless communication interface;
a memory; and
a processing unit communicatively coupled with the wireless communication interface and the memory and configured to:
measure, using the wireless communication interface, a time of arrival (TOA) for a first reference signal received from a first base station;
determine a first Round Trip signal propagation Time (RTT) between the first base station and the UE based at least in part on the TOA;
measure, using the wireless communication interface, a first Reference Signal Time Difference (RSTD) between a second reference signal for the first base station and a third reference signal for a second base station;
receive, using the wireless communication interface, a first real time difference (RTD) between the first base station and the second base station, based on a second RTT between the first base station and the second base station; and
determine a location of the UE, based at least in part on the first RTT, the first RSTD, and the first RTD.

28. The UE of claim 27, wherein the processing unit is further configured to:
send, using the wireless communication interface, an uplink signal to the first base station; and
receive, using the wireless communication interface, a timing measurement for the uplink signal from the first base station;
wherein the processing unit further determines the first RTT based at least in part on the timing measurement.

29. The UE of claim 27, wherein the processing unit is further configured to:
measure, using the wireless communication interface, a second RSTD between a fourth reference signal for the first base station and a fifth reference signal for a third base station; and
receive, using the wireless communication interface, a second RTD between the first base station and the third base station;
wherein the processing unit determines the location of the UE further based at least in part on the second RSTD and the second RTD.

* * * * *